(12) United States Patent
Darling, III

(10) Patent No.: US 6,270,092 B2
(45) Date of Patent: Aug. 7, 2001

(54) PORTABLE CART

(76) Inventor: Charles W. Darling, III, 6 Wells La., Hampton Bays, NY (US) 11946

(*) Notice: Subject to any disclaimer, the term of this patent is extended or adjusted under 35 U.S.C. 154(b) by 0 days.

(21) Appl. No.: 09/745,116

(22) Filed: Dec. 21, 2000

Related U.S. Application Data

(63) Continuation of application No. 09/479,344, filed on Jan. 7, 2000, now Pat. No. 6,164,671, which is a continuation-in-part of application No. 09/226,838, filed on Jan. 7, 1999, now Pat. No. 6,142,491.

(51) Int. Cl.[7] .................................................. B62B 1/12
(52) U.S. Cl. .................. 280/30; 280/414.2; 280/652; 280/47.26; 280/47.33; 280/47.331; 280/292
(58) Field of Search ....................... 296/20; 224/627, 224/628; 5/626, 627; 280/30, 63, 414.1, 414.2, 47.3, 47.33, 47.32, 47.18, 47.26, 47.331, 204, 292, 651, 652

(56) References Cited

U.S. PATENT DOCUMENTS

| | | | |
|---|---|---|---|
| 806,097 | * | 12/1905 | Baumann ....................... 280/47.33 X |
| 910,728 | * | 1/1909 | Russell ............................... 280/47.33 |
| 2,467,075 | * | 4/1949 | Birnberg ........................... 280/47.33 |
| 2,868,559 | * | 1/1959 | Vincelette ......................... 280/47.33 |
| 2,918,296 | * | 12/1959 | Goodale ......................... 280/47.3 X |
| 2,979,338 | * | 4/1961 | Dwyer ................................. 280/47.3 |
| 3,034,801 | * | 5/1962 | Huston ........................... 280/47.3 X |
| 3,054,622 | * | 9/1962 | Davis et al. ................... 280/47.3 X |
| 3,159,410 | * | 12/1964 | Raymond ....................... 280/414.2 X |
| 3,188,108 | * | 6/1965 | Davis ................................. 280/47.331 |
| 3,236,537 | * | 2/1966 | Eckman .......................... 280/47.3 X |
| 3,403,924 | * | 10/1968 | Oliveira ................................. 280/63 |
| 4,055,354 | * | 10/1977 | Sharpe .......................... 280/47.32 X |
| 4,214,774 | * | 7/1980 | Kluge .......................... 280/47.331 X |
| 4,444,405 | * | 4/1984 | Barrus ................................. 280/47.3 |
| 4,550,925 | * | 11/1985 | McDonough ................... 280/47.331 |
| 4,789,180 | * | 12/1988 | Bell ................................ 280/47.33 X |
| 4,826,187 | * | 5/1989 | Abbott et al. ................. 280/47.33 X |
| 5,320,371 | * | 6/1994 | Levad ........................... 280/414.1 X |
| 5,695,208 | * | 12/1997 | Baechler et al. ..................... 280/204 |
| 5,820,141 | * | 10/1998 | Wilkerson ....................... 280/47.3 X |
| 5,829,771 | * | 11/1998 | Hsu ................................. 280/292 X |

\* cited by examiner

*Primary Examiner*—Michael Mar
(74) *Attorney, Agent, or Firm*—Alfred M Walker

(57) ABSTRACT

A portable cart, for use in camping, hunting and other outdoors activities carries canoes, small boats, game, injured parties or hauled cargo by hand. The portable cart can be converted to a canoe or boat cart which can be folded down and transported within the canoe or boat, or to a game cart for transporting game over long, rough terrain, or to a cargo hauling gear cart, all of which can broken down into a carrying position, by hand or by back. The portable cart can be carried by hand or as a backpack over rough terrain. Its width can be varied to accommodate watercraft of varying widths. The cart has optional removable clamps for clamping a conventional transportable carrier, such as a stretcher or stokes-type rescue carrier bed, thereto. Another optional bicycle pull clamp includes an ant-tipping attachment resisting centrifugal force urging said cart to tip over during a directional turn of the cart-hauling bicycle. It is collapsible, so that it can be disassembled and carried in a canoe or small boat, and then reassembled at another destination along the canoe or boat's journey.

23 Claims, 20 Drawing Sheets

PORTABLE CART

This application is a continuation of application Ser. No. 09/479,344, filed Jan. 7, 2000, now U.S. Pat. No. 6,164,671, and which is a continuation-in-part of application Ser. No. 09/226,838, filed Jan. 7, 1999, now U.S. Pat. No. 6,142,491 dated Nov. 7, 2000.

FIELD OF THE INVENTION

The present invention relates to a portable cart, for use in camping, hunting, search and rescue, and other outdoors activities.

BACKGROUND OF THE INVENTION

Various carts exist for carrying canoes and small boats by hand. Other outdoors-oriented carts exist for carrying game. In addition, wheelbarrows and small carts are used for transporting gear at outdoors locations. However, none of the existing carts can be converted to a versatile portable cart which can interchangeably function as a portable canoe or boat cart which can be folded down and transported within the canoe or boat, as a game cart for transporting game over long, rough terrain, or as a gear cart, all of which can broken down into a carrying position, by hand or by back.

OBJECTS OF THE INVENTION

It is therefore an object of the present invention to provide a universally adaptable carrier cart.

It is also an object of the present invention to provide a cart for carrying canoes and small boats by hand.

It is also an object of the present invention to provide an outdoors-oriented cart for carrying game or injured parties.

It is yet another object of the present invention to provide a small cart with a well for transporting gear at outdoor locations.

It is also an object of the present invention to provide a versatile portable cart which can interchangeably function as a portable canoe or boat cart which can be folded down and transported within the canoe or boat, as a game cart for transporting game over long, rough terrain, or as a gear cart, all of which can be broken down into a carrying position, by hand or by back.

It is yet another object to provide a portable cart which is either backpackable or which can be carried by hand.

It is further another object to provide a portable search and rescue cart adapted to carry a stretcher or other carrier for an injured person such as what is referred to in the industry as a Stokes-type basket or other medical rescue equipment.

It is yet another object to provide a carrier for transporting military equipment and ordance.

It is yet another object to provide a cart-hauling clamp for pulling the portable cart behind a bicycle while resisting tipping over of the cart during directional change of the cart-hauling bicycle.

It is also an object of the present invention to improve over the disadvantages of the prior art.

SUMMARY OF THE INVENTION

In keeping with these objects and others which may be apparent, the present invention relates to a portable cart, for use in camping, hunting search and rescue operations and other outdoors activities for carrying canoes and small boats by hand. It may also carry game, injured parties or be used for transporting gear at outdoors locations. It is a versatile portable cart which can interchangeably function as a portable canoe or boat cart which can be folded down and transported within the canoe or boat, as a carry cart for transporting game or injured parties over long, rough terrain, or as a gear cart, all of which can be broken down into a carrying position, by hand or by back.

The portable cart is under thirty (30) pounds, preferably twenty two (22) to twenty eight (28) pounds, so that it can be carried by hand or within a backpack over rough terrain. It is collapsible, so that it can be disassembled and carried in a canoe or small boat, and then reassembled at another destination along the canoe or boat's journey.

To prevent flat tires, its wheels are preferably solid core tires which cannot get flat, with stainless steel bearings, over which the wheels rotate. A typical wheel has two press fit bearings adjacent to an integrally molded hub. While the typical wheel is about 2–3 inches wide, for transporting cargo or game on sand or granular terrain, the wheels may be wider, such as 4–6 inches in width.

For hardiness, the material of the structural frame components is preferably a lightweight but strong material, such as, for example, 60–61 T6 fully anodized aluminum, or stainless steel.

The portable cart can hold up to 500 pounds, and for manual pulling easily pulls 300 pounds. The portable cart is durable to carry heavy weight over rough terrain, such as rock-strewn dirt trails or sloping riverbank surfaces.

To carry a canoe or boat, two horizontal load supports optionally include support cushions upon which the canoe or boat rests. The position of the horizontal load supports can be varied to accommodate various widths of the canoe or boat.

To function as a game or rescue cart, a frame, such as a pair of U-shaped rails which are joined end to end, is provided upon the horizontal load supports to form a rounded rectangular frame, over which a taunt, but slightly stretchable, bed of fabric is placed, such as canvas or other flexible material, i.e., plastic or netting. The bed includes sewn loops through which portions of the U-shaped rails of the frame are inserted. Other fabric fasteners such as clips, zippers or eyelets can be also used.

In an alternate embodiment, the boat support cushions are removable from the horizontal load supports and are replaced by a two piece clamp, which attaches by at least one fastener, such as a pair of screws, to the horizontal load supports of the cart. Conventional stretchers or personal rescue carriers, such as Stokes-type baskets, are clamped to the cart within the clamps on each respective horizontal load support. In this embodiment, the boat support cushions are attached to a thin plate, such as of ⅛ inch aluminum or otherwise, which has at least one fastener such as a pair of threaded studs, insertable with the respective hole or holes in the horizontal load supports, so that the boat support cushions can be removed and replaced by the stretcher-bearing clamps.

To function as a wagon cart with a well for carrying gear, a hollow fabric well, such as of canvas, is draped between said horizontal load members and over and around the front and rear U-shaped brackets. A cover may be provided to cover the gear therein. The well and cover can also be made of other suitable flexible materials, such as plastic, netting or canvas.

Kickstands may be optionally provided to stabilize the portable cart during rest or during loading of contents thereon.

In yet another embodiment, an anti-tipping bicycle attachment is provided to attach the cart to a bicycle while preventing the cart from turning over during transportation.

Furthermore, the cart of the present invention can be disassembled and broken down for hand held or back pack transport and it can easily be assembled for its varied uses. Moreover, when a boat or canoe is carried, the cart has a precision balance feature that rotates the wheels to maintain the cart in a horizontal stable position.

DESCRIPTION OF THE DRAWINGS

The present invention can best be described in connection with the accompanying drawings, in which.

DETAILED DESCRIPTION OF THE PREFERRED EMBODIMENTS

Figure 1:
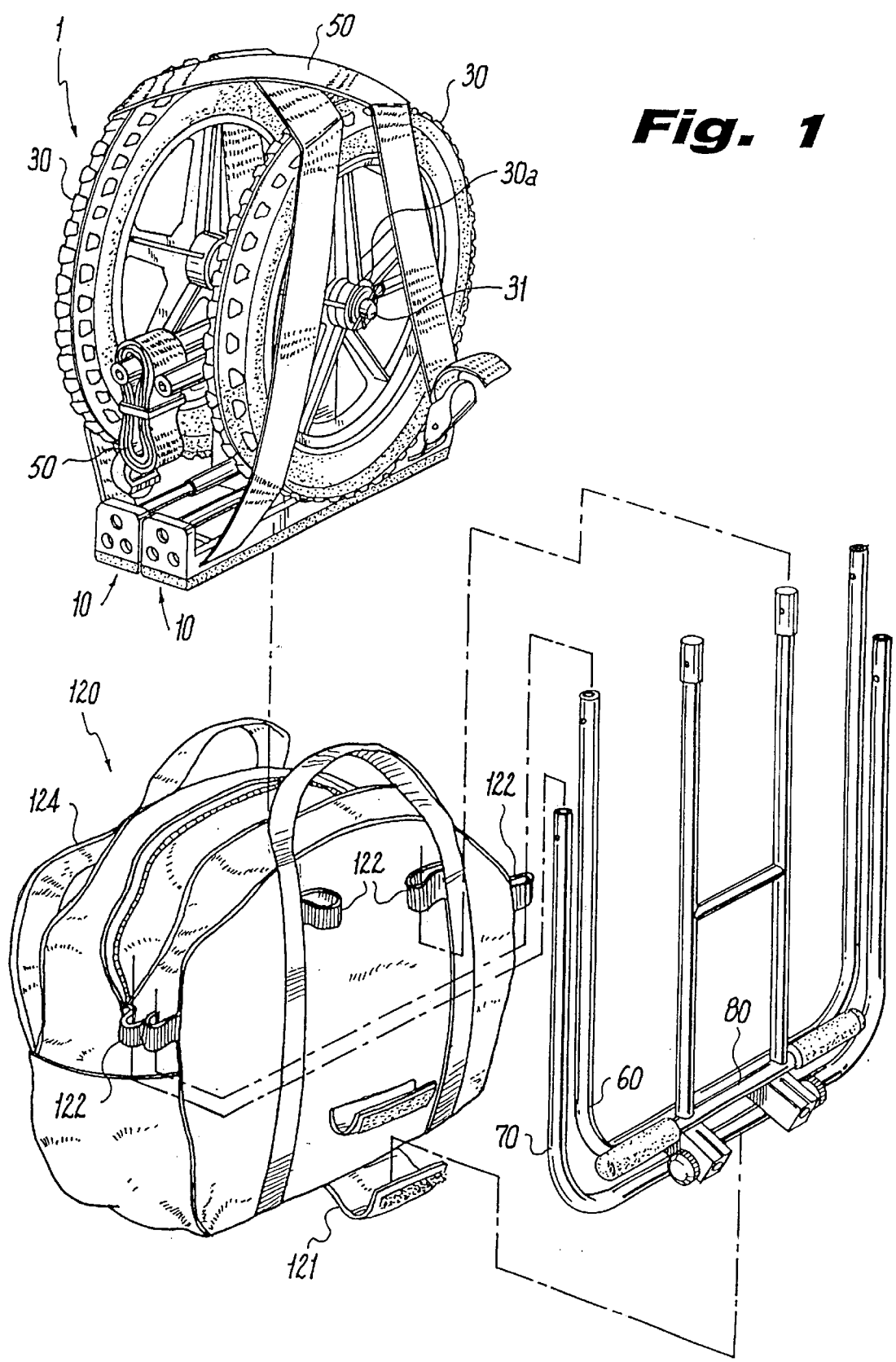
FIG. 1 is an exploded perspective view of the components of the basic cart embodiment broken down for transport within and on the storage backpack.

As shown in the drawing FIGS. 1–20, the present invention is directed to foldable cart 1, for carrying a boat, such as a canoe, which can also function as a game cart or a wagon for carrying gear in outdoor field applications.

FIG. 1 shows cart 1 in a disassembled storage position with a pair of horizontal load support members 10 laid parallel adjacent to each other, supporting wheels 30 thereon. Wheels 30 are secured in place by a transverse connecting rod 31 through wheel hubs 30a and by one or more load securing straps 50. Disassembled storage cart 1 is inserted within carry bag 120, which includes ledge 121 and fabric loops 122 for holding bracket members 60, 70 and handle 80 outside of carry bag 120.

Figure 2:
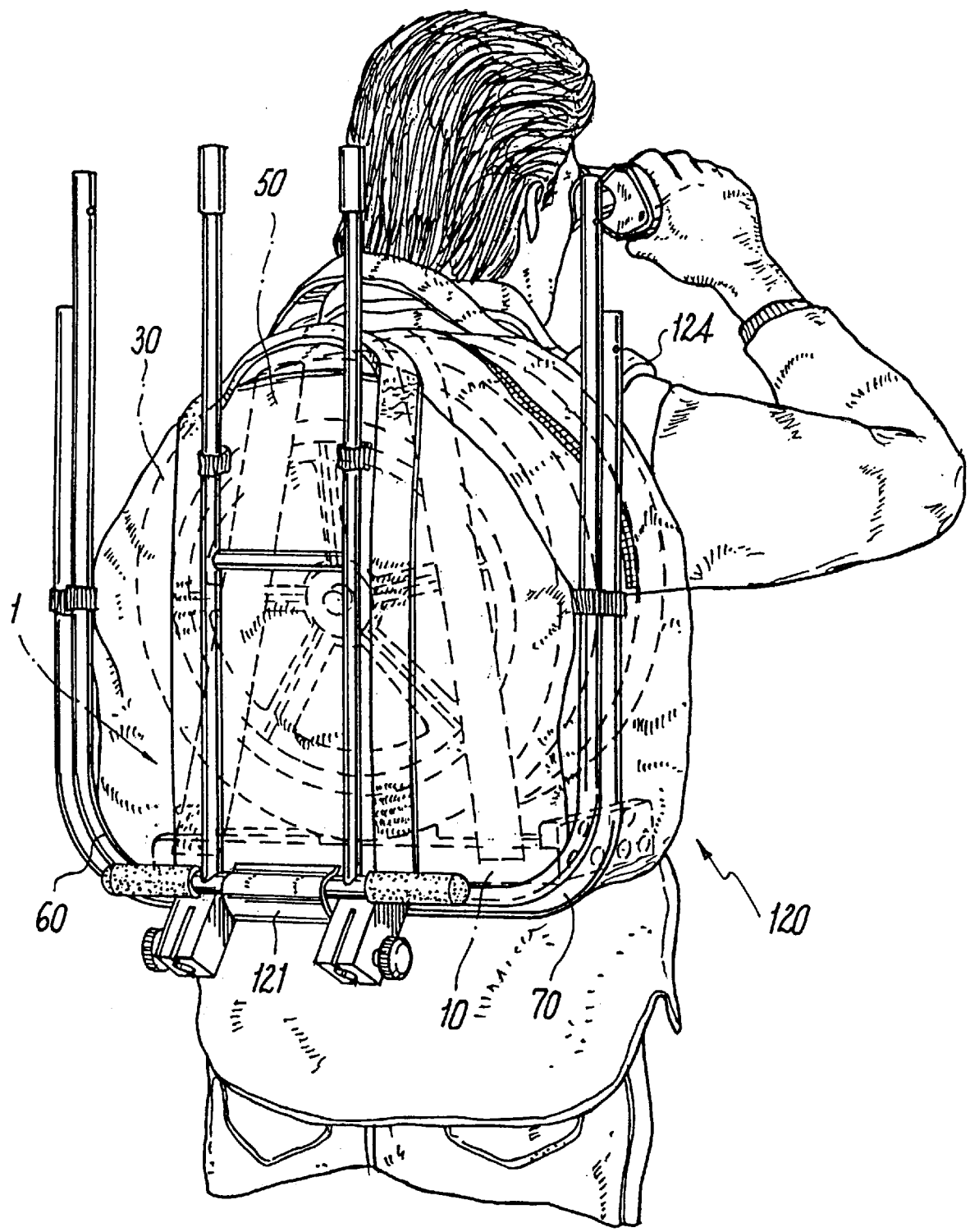
FIG. 2 is a perspective view of the backpack on a user, with the cart contained therein.

To transport portable cart 1 by hand carry straps 124a are attached to carry bag 120. Conversely as shown in FIG. 2, to transport portable cart 1 upon the back of a user, carry straps 124 are attached to carry bag 120, which supports portable cart 1 in a weight bearing manner, or else horizontal support members 10 are inverted to support portable cart 1 in a weight bearing manner, and carry bag 120 covers portable cart 1 in a non-weight bearing manner.

To be disassembled in a carry position, U-shaped brackets 60, 70, kickstand members 40, wheels 30 and axle members 32 are inversely attached to horizontal load supports 10 to comprise a folded manually transportable cart.

Figure 3:
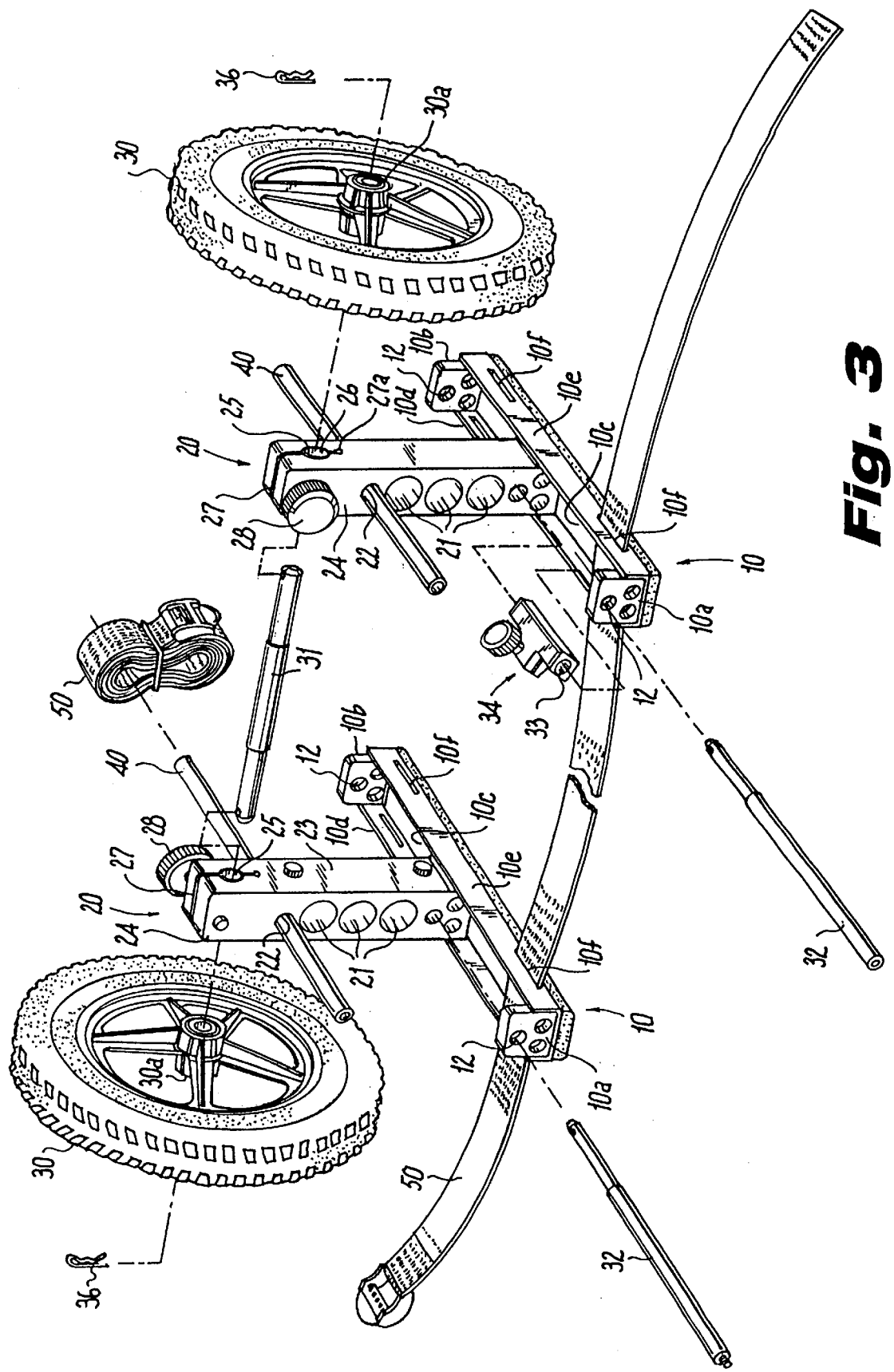
FIG. 3 is an exploded inverted perspective view of the basic cart embodiment components, disassembled from their original transport configuration.

As shown in the exploded view of FIG. 3, in the storage position, cart 1 includes a pair of parallel, spaced apart inverted horizontal load support members 10. Support members 10 each have a front end 10a and a rear end 10b. The front and rear ends 10a, 10b each have at least one axially placed receptacle aperture 12 extending longitudinally within each load support member 10, for holding structural components therethrough in a storage position, such as axle members 32 for wheels 30. In this storage position, axle members 32 are also inserted within aperture of 33 of axle connector 34.

FIG. 3 also shows horizontal load support members 10 having preferably a generally upside down U-shaped configuration when viewed in cross-section, wherein a generally flat member 10c has downwardly extending flanges 10d, 10e including one or more linearly extending slots 10f for insertion of holding straps 50 therein.

While size may vary, support member 10 is preferably sixteen (16) inches long and two and a quarter (2.25) inches wide. Each flange 10d, 10e extends down about one (1) inch from flat member 10c. Slots 10f are preferably 2.125 inches wide and 0.1875 inches high, to accommodate straps 50, such as, for example, standard 2-inch wide fabric straps.

Figure 4:
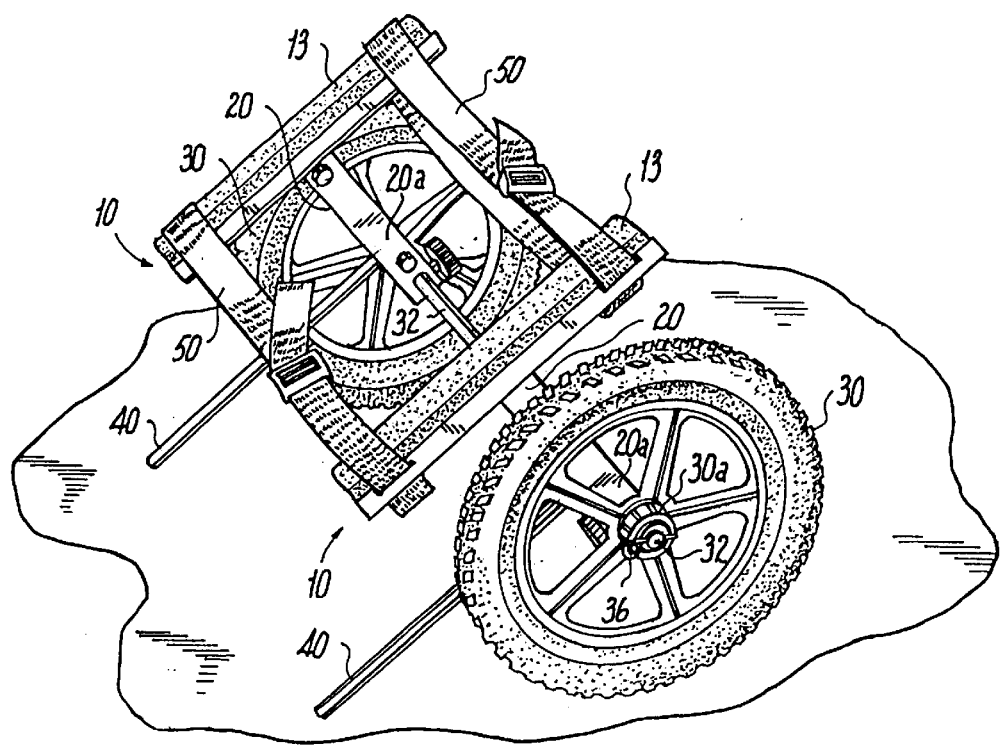
FIG. 4 is a perspective view of the assembled boat cart.

FIG. 3 also shows horizontal load support members 10 being respectively demountably attached to a pair of vertical struts 20, having apertures 21 and 22. FIG. 4 shows vertical struts 20 optionally having at least one small hole 22, such as kickstand receptacle aperture 22, for insertion of optional kickstand 40 therein. Kickstand 40 is secured in place by a fastener, such as nylon set screw 37. Set screws 37 also hold axle members 32 in the storage position through vertical struts 20.

Vertical struts 20 are preferably made from 1 ½×2-inch solid bar stock anodized aluminum, or stainless steel. Vertical struts 20 are preferably about 10.25 inches long, 2 inches wide and 1 ½ inches in depth.

Also shown in FIG. 3, the plurality of larger holes 21, such as holes which are 0.765 or 1.625 inches in diameter, are located on a front side of vertical strut 20. Smaller hole 22 on the bottom accommodates kickstand 40, which is preferably a hollow aluminum tube of 0.75-inch diameter and 16 inches in length.

Larger holes 21 within vertical strut 20 are provided for weight reduction of portable cart 1.

On a side 23 transverse to the front 24 of each vertical strut 20, at a lower portion 20a thereof, is provided a further hole 25 of about 1-inch in diameter for insertion of each axle member 32 therethrough. Hole 25 has a permanently affixed, bushing 26 therein, such as a PVC (polyvinyl chloride) bushing, to prevent wear and tear of each aluminum axle member 32 by the aluminum surface of hole 25.

Figure 6:
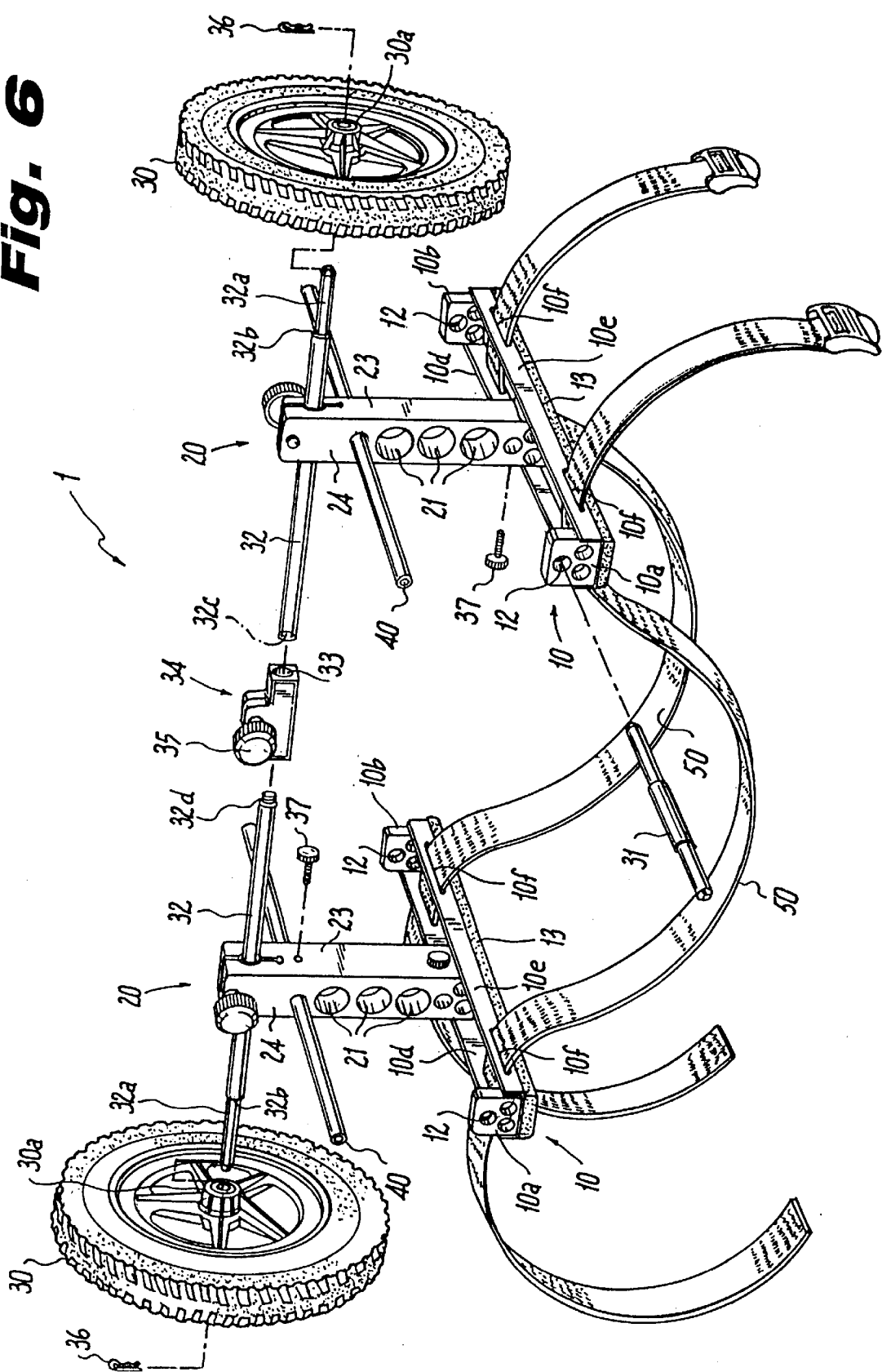
FIG. 6 is an exploded perspective view, inverted, of the components required to assemble the boat cart.

As also shown in FIGS. 3, 4 and 6, each wheel 30 is demountably attached at an end, respectively, to a pair of axle members 32, with axle members 32 extending inwardly from and demountably attached to lower portion 20a of said respective vertical struts 20, wherein axle members 32 are in a transverse relationship to horizontal load support members 10. Fasteners, 36, such as cotter pins, hold each wheel 30 upon each axle 32. Each axle member 32 is received within each hole 25, of each lower portion 20a of each vertical strut 20. A compression groove 27 exists from the underside of vertical strut 20 to hole 25 and continues to further through hole 27a, providing for compression of lower portion 20a of vertical strut 20.

To accommodate cargo, such as watercraft of varying widths, the distance between vertical struts 20 can be varied along the axle length by loosening and tightening the tightening member 28 and moving vertical struts 20 laterally apart or towards each other along axle members 32.

Although optionally a one piece axle may be used (not shown), preferably the pair of axle members 32 are held in opposite axial orientation by straight rigid axle connector 34. Axle connector 34 has tightening member 35, and a pair of receptacles 33 at the respective two ends of axle connector 34, so that axle members 32 respectively extend outwardly from, and are demountably attached within, said axle connector receptacle bore 33.

While the axle may be optionally a one-piece axle (not shown), preferably the pair of connected oppositely extending axle members 32 form an axle for wheels 30.

Each axle member 32 is made of solid round stock of anodized aluminum or stainless steel, approximately 0.75 inches in diameter. At the wheel-supporting end 32a, the diameter is about 0.59 inches in diameter with shoulders 32b of about 0.08 inches in height, transverse to the axis of axle member 32. These shoulders 32b provide a resting surface to prevent axial movement of wheel 30 upon axle member 32.

Figure 7:
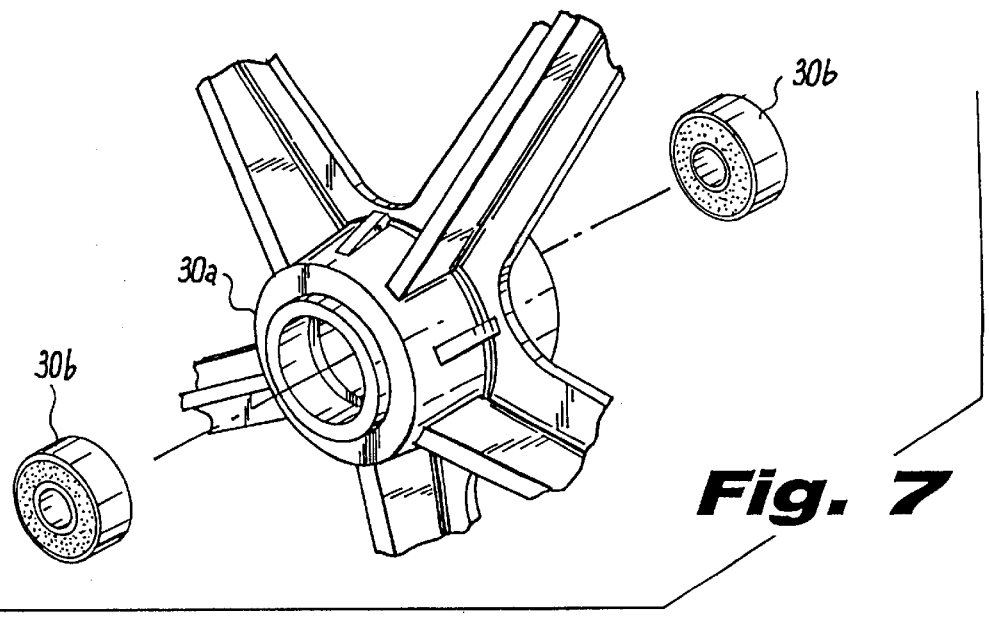
FIG. 7 is an exploded perspective of a typical wheel, showing two press fit bearings adjacent an integrally molded hub.
Figure 8:
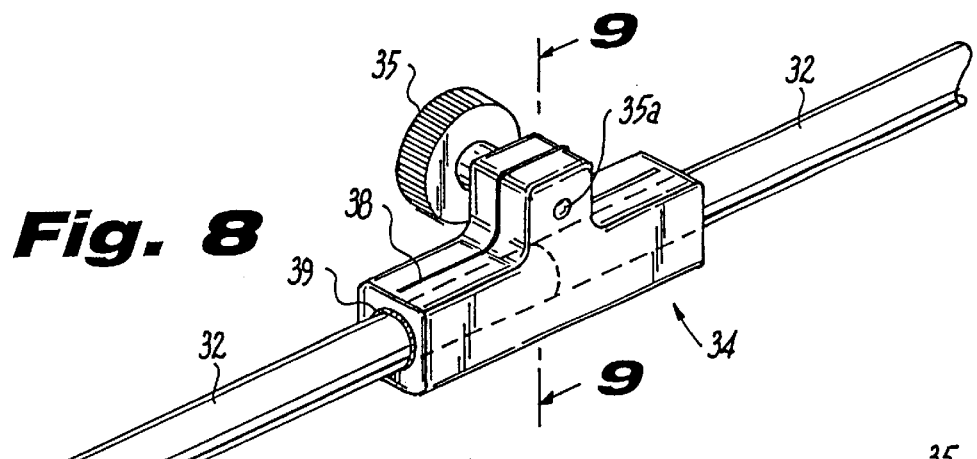
FIG. 8 is a perspective view of an axle locking member, installed on the assembled axle.

As shown in FIG. 7, each wheel 30 rotates about press fit bearings 32b, while each wheel 30 is positioned upon each respective axle member 32 of FIG. 8. As shown in FIG. 6, at the opposite end of one axle member 32, there is provided a hollow, threaded recess 32c of about 0.75 inches deep, to accommodate a connecting threaded member 32d of other axle member 32, to axially connect both axle members 32 together within axle connector 34, with a wheel 30 at each end.

Figure 9:
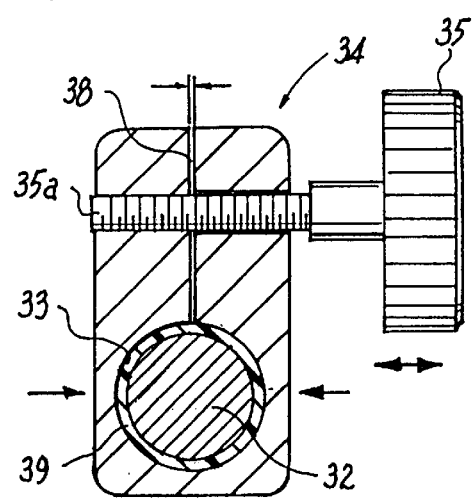
FIG. 9 is a sectional elevation view, taken through lines 9—9 of FIG. 8, showing the locking member compressing and locking the axle joint.

FIGS. 8 and 9 show how axle connector 34 is compensated along groove 38, thereby locking axle members 32 within bushing 39, which is within receptacle bore 33 of axle connector 34, by tightening of tightening bolt 35a of tightening member 35. Preferably bushing 39 is a PVC (polyvinyl chloride) bushing. Groove 38 is preferably $\frac{1}{16}$ to $\frac{1}{8}$ inch, in width, which allows for the compression of axle connector 34 around axle members 32. Tightening bolt 35a is inserted within a conventional receptacle which is a through hole at the proximal end and which is tapped with threaded grooves at the distal end, to allow for compression of axle connector 34.

FIGS. 4 and 6 also show at least one kickstand 40, preferably a pair, respectively extending horizontally rearward from each lower portion of vertical struts 20. Each kickstand member 40 extends rearwardly from the at least one kickstand receptacle aperture 22 of respective vertical struts 20 and each kickstand 40 is demountably attached within each respective kickstand receptacle aperture 22. Each kickstand member 40 is preferably contoured so as to contact the ground to stabilize portable cart 1 is a parked position of rest.

Figure 5:
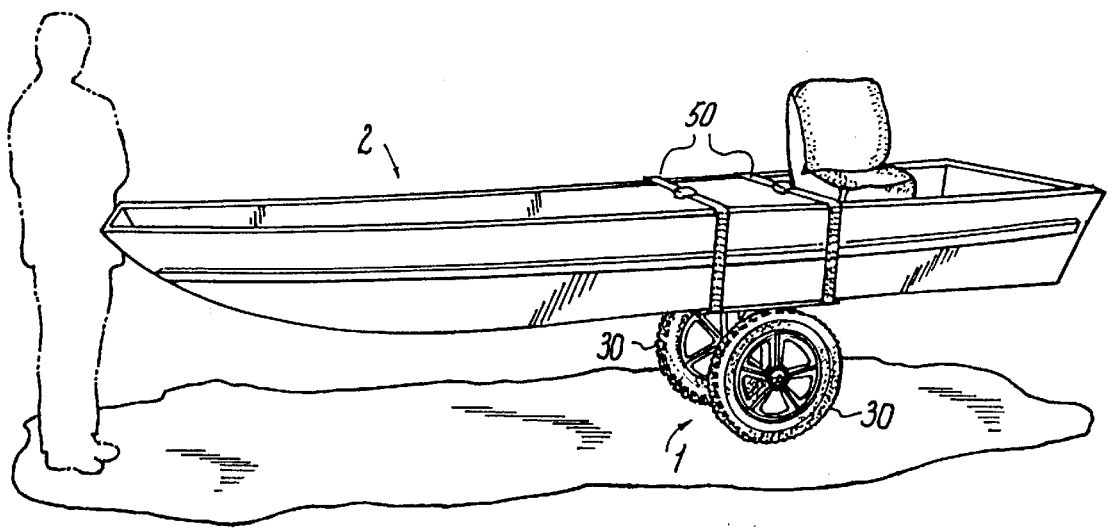
FIG. 5 is a perspective view of the assembled cart with a boat fastened for transport.

As shown in FIG. 5, to hold a canoe, game or cargo in place upon cart 1, one or more adjustable load-securing straps 50 are slidably attached to both respective horizontal load supports 10 in a transverse relationship to load supports 10. Straps 50 are preferably reinforced flexible canvas straps of about 2 inches in width.

To complete portable cart 1 as a canoe or boat cart, FIG. 4 shows support cushions 13 mounted upon respective horizontal load supports 10. Support cushions 13 are flexible, such as of rubber or foam, to support the weight of boat 2 thereon.

Figure 10:
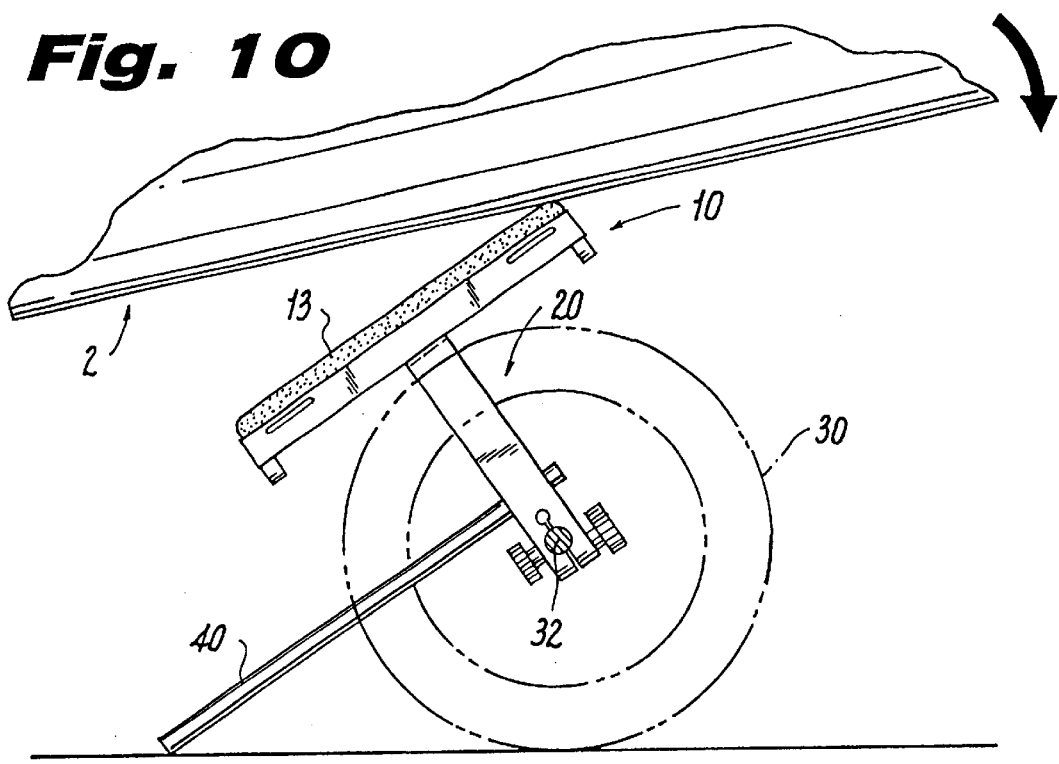
FIG. 10 is a diagrammatic side elevation view of the boat cart in its resting position, with a boat hull contacting the raised edge.
Figure 11:
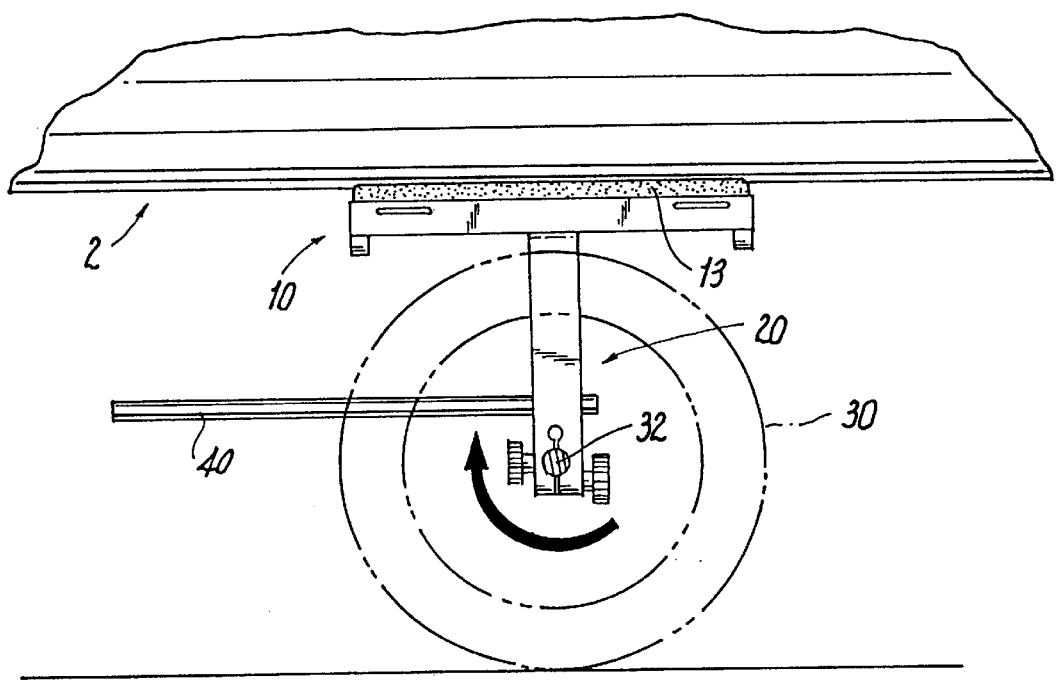
FIG. 11 is a diagrammatic side elevation view of the boat cart with the boat hull positioned and fully installed, illustrating the precision balancing feature of the cart.

FIGS. 10 and 11 show the precision balancing of boat 2 upon cart 1, wherein the placement of boat 2 upon cart 1 causes cart 1 to rotate from a position of rest in FIG. 10 to a horizontal load position of FIG. 11, in the direction of the arrow.

Figure 18:
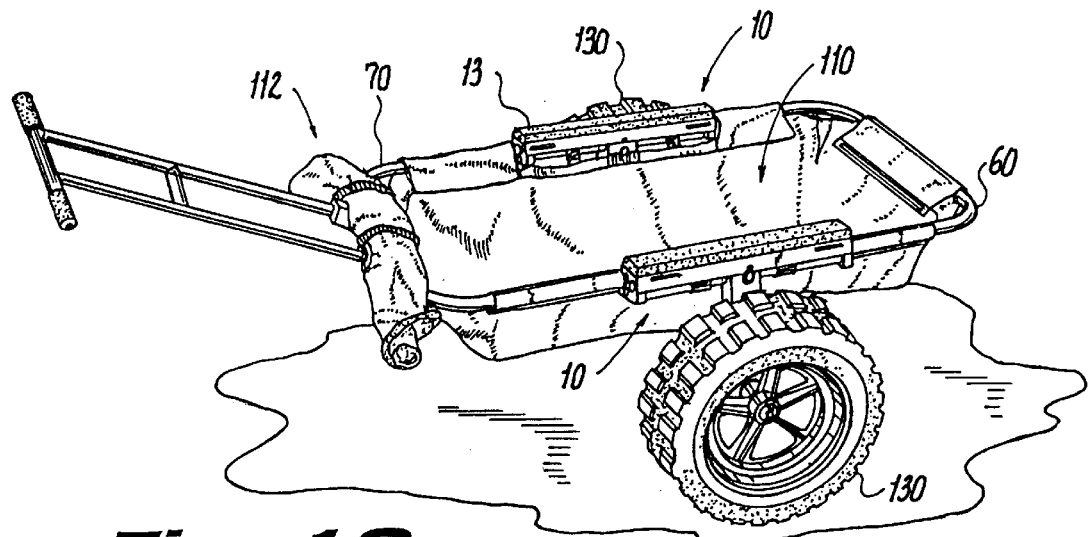
FIG. 18 is a perspective view of a further embodiment, a cart for transporting cargo, equipped with optional wide tires and axle for use on sand or granular terrain.
Figure 19:
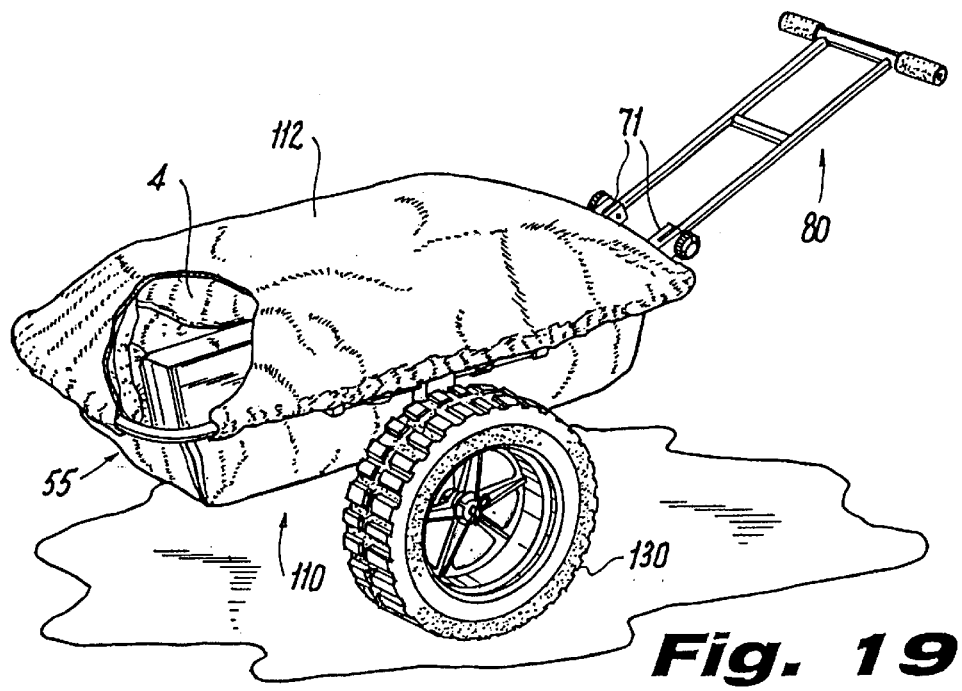
FIG. 19 is a perspective view of a fully loaded cargo cart, with the cover material partially cutaway to reveal its contents.
Figure 20:
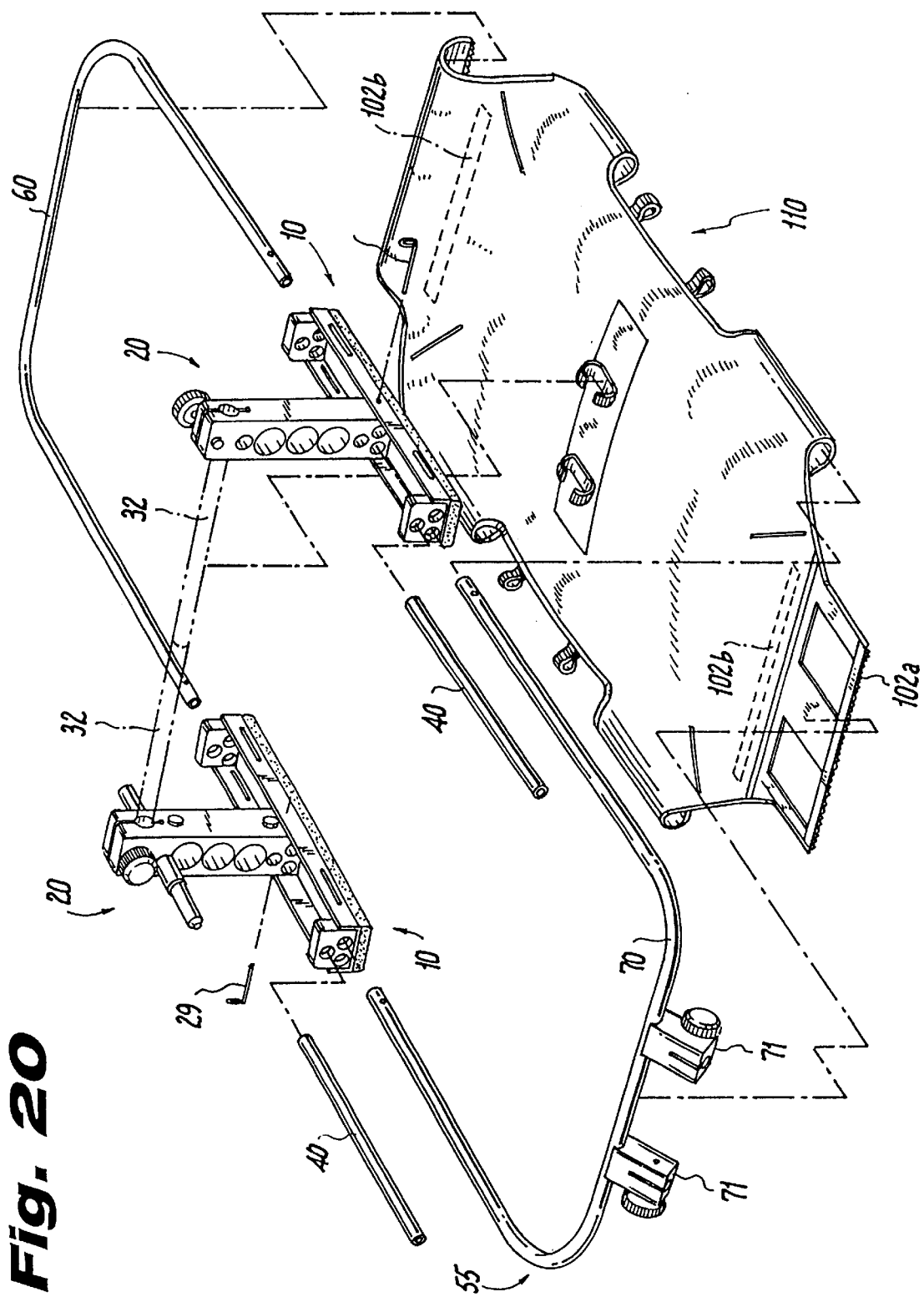
FIG. 20 is an exploded perspective view, inverted, of the cargo cart, illustrating the attachment of the canvas material to the framework components.
Figure 21:
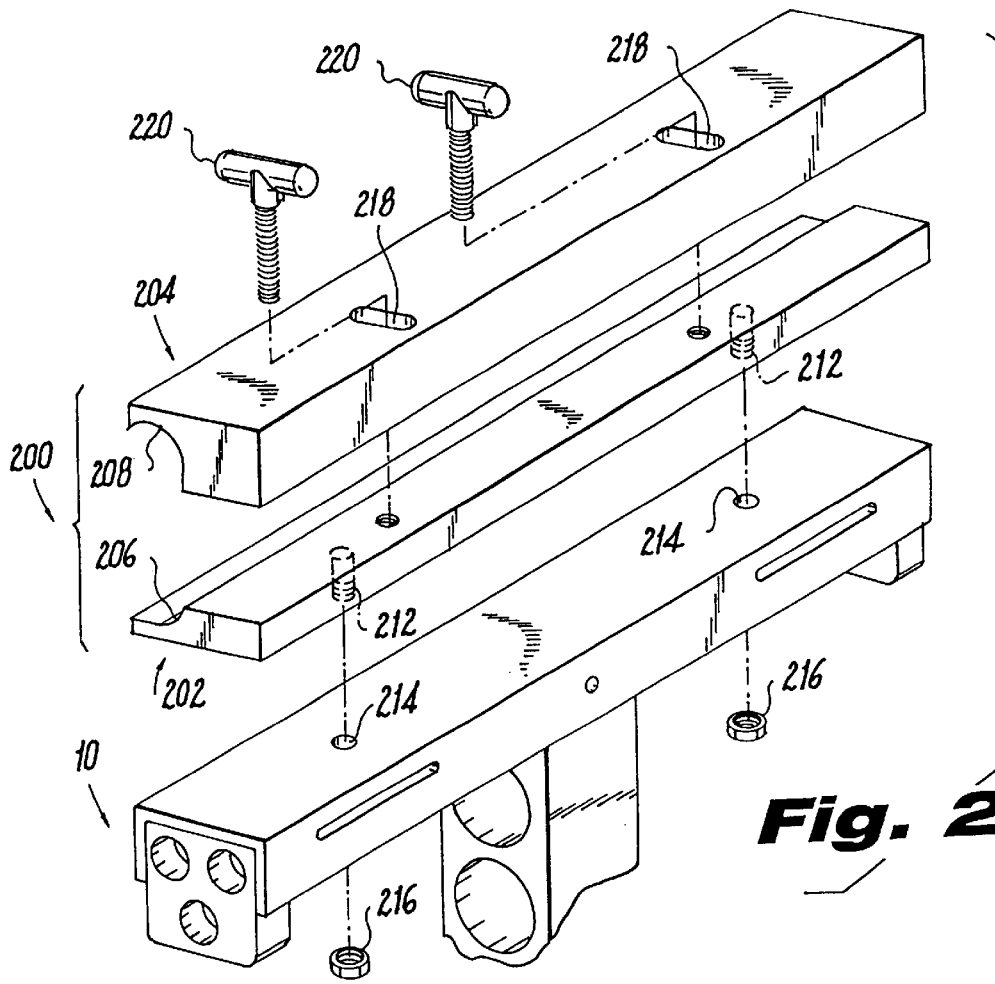
FIG. 21 is another exploded perspective detail view of the components for a stretcher hauling clamp of an alternate embodiment for a search and rescue cart.
Figure 22:
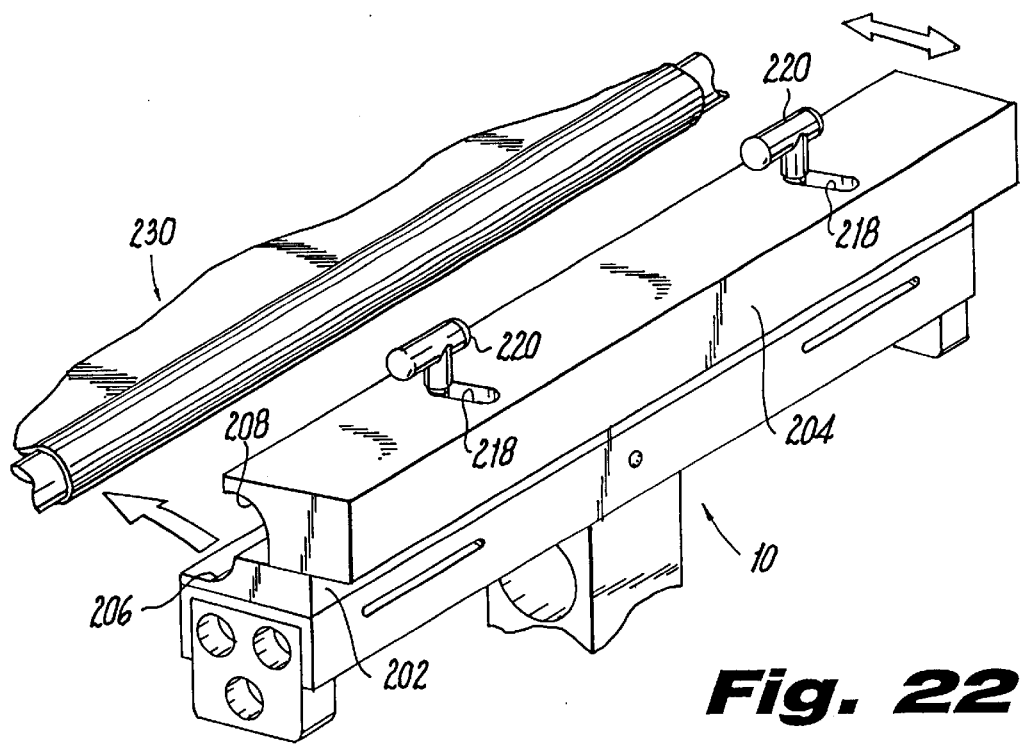
FIG. 22 is a perspective view of the clamp embodiment shown in FIG. 21, showing the sliding action of the clamp therein, for quick removal of the stretcher therefrom.

FIGS. 12–17 show how to convert portable cart 1 into a game cart. FIGS. 18–20 show how to convert cart 1 into a cargo wagon with a hollow well. First, in either situation, carry frame 55 is secured to horizontal load supports 10. Although a one piece, generally rectangular frame (not shown) may be used, preferably frame 55 includes a pair of U-shaped brackets 60, 70 joinable together to form frame 55.

Alternatively a clamp maybe provided to horizontal load supports 10 to carry a frame of a discrete transportable carrier directly thereon, as disclosed hereinafter with respect to FIGS. 21–24. In that case, instead of the frame being integrally part of the portable chart, as in FIGS. 12–17, in FIGS. 21–24, the frame is clamped to the horizontal load supports 10 of portable cart 1.

Meanwhile further with respect to FIGS. 12–17, U-shaped front bracket 60 extends horizontally forward from front-end receptacle apertures 12 of horizontal load supports 10, wherein front bracket 60 is demountably attached within front-end receptacle apertures 12 at one end of horizontal load supports 10.

U-shaped rear bracket 70 extends horizontally rearward from oppositely positioned rear end receptacle apertures 12 of horizontal load supports 10 and rear bracket 70 is demountably attached within each oppositely positioned rear end receptacle aperture 12 of horizontal load supports 10.

Figure 13:
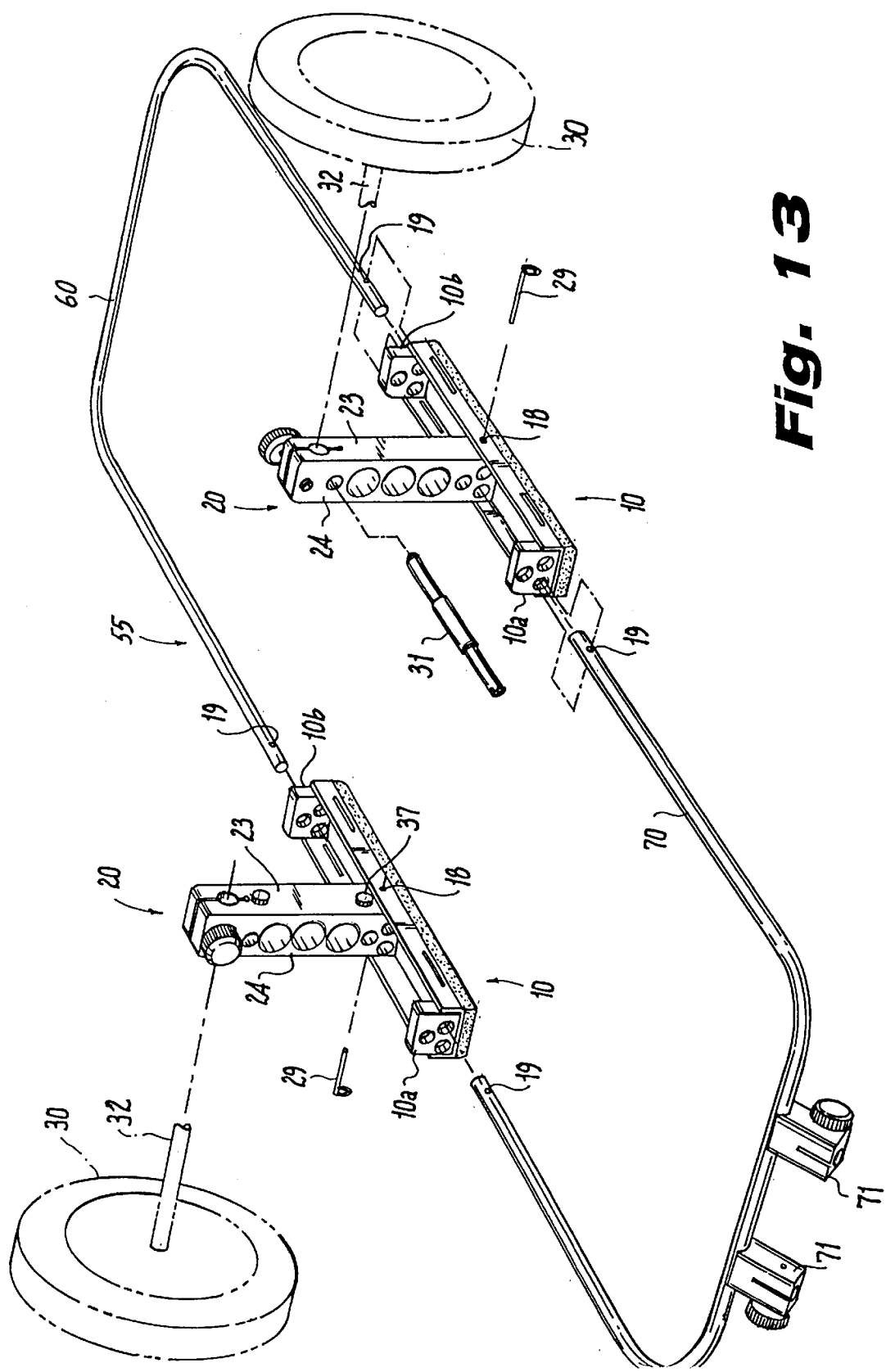
FIG. 13 is an exploded perspective view of the inverted gaming cart, illustrating the framework fastening method.

FIG. 13 shows how frame 55 is secured to cart 1. Each distal end of U-shaped front bracket 60 is inserted through apertures in respective ends 10b of horizontal supports 10 until each distal end engages a corresponding hole in each vertical support 20, where they are held in place by pins 29. Pins 29 engage lateral holes 18 in horizontal supports 10 and corresponding through holes 19 in distal ends of U shaped brackets 60. Likewise, each distal end of U-shaped rear bracket 70 is inserted through apertures in respective ends 10a of horizontal supports 10 until each distal end engages a corresponding hole in each vertical support 20, where it is also held in place by a pin 29. Pins 29 engage lateral holes 18 in horizontal supports 10 and corresponding through holes 19 in distal ends of U shaped brackets 60, 70 of frame 55.

U-shaped brackets 60, 70 are preferably of hollow, anodized aluminum tubing of about 0.75 inches in diameter. The length of each distally extending side member thereof is about 23.50 inches and the width of the cross bar connecting the distal side members is about 21.63 inches. About 0.75 inches from each distal end is a scoring, to accommodate a clamp thereon, to form frame 55.

Figure 12:
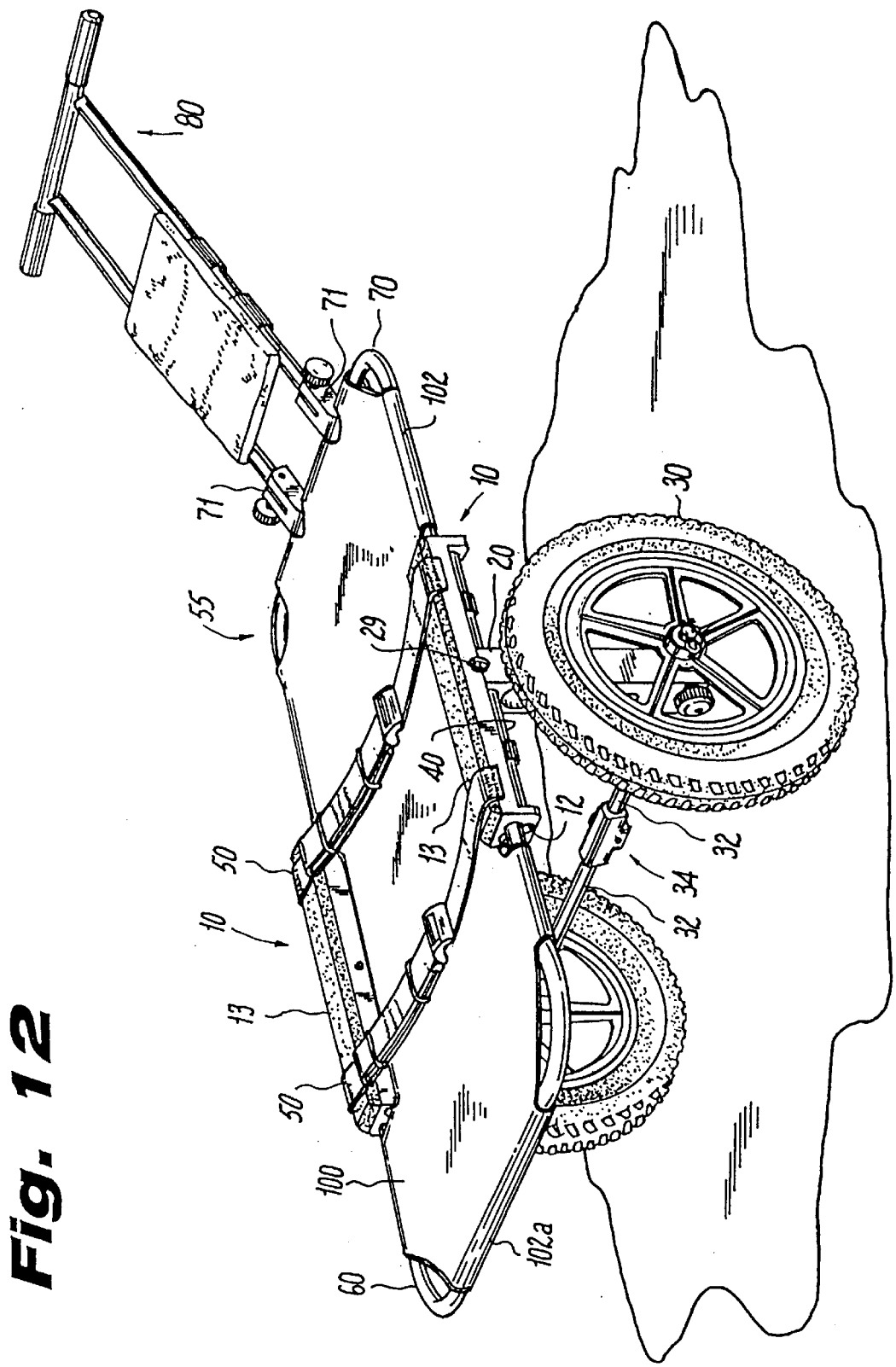
FIG. 12 is a perspective view of the assembled alternate embodiment cart, for hunting/gaming applications.
Figure 15:
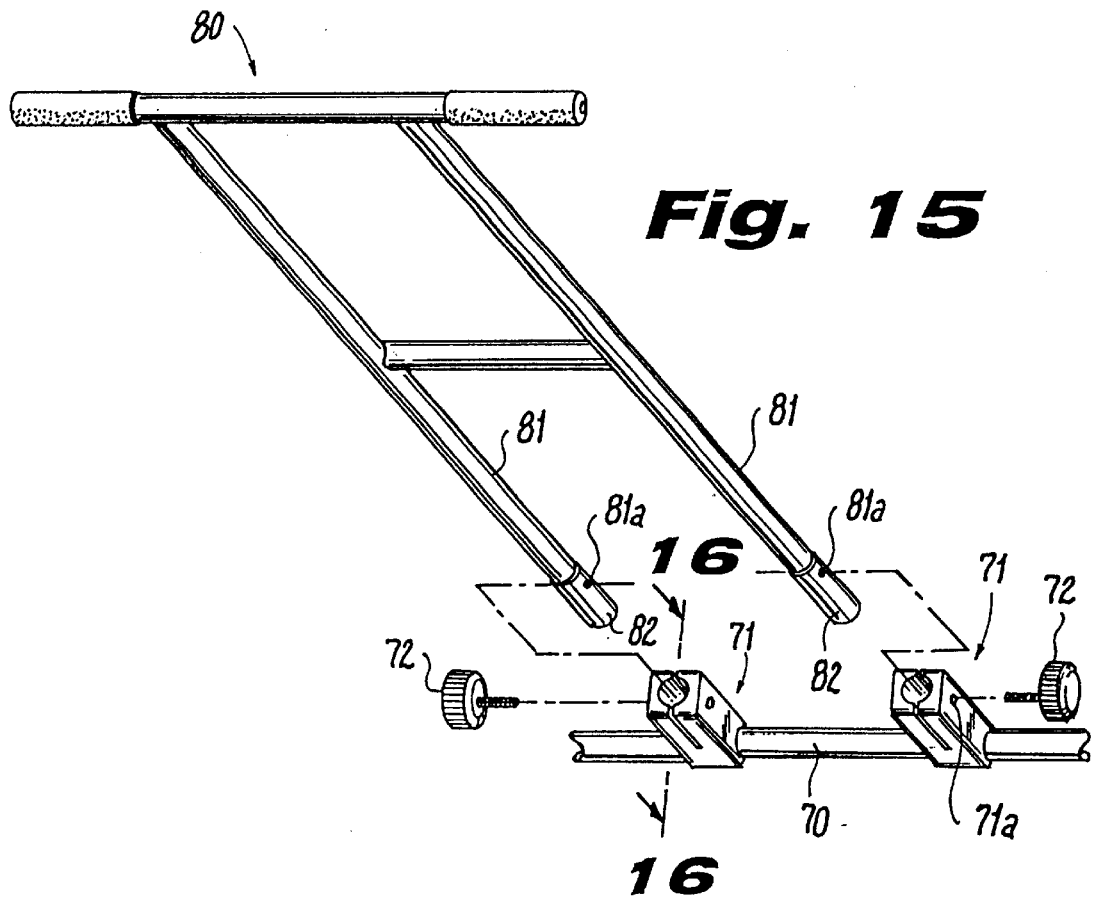
FIG. 15 is an exploded perspective view of the attachment of the handlebar component to the locking receptacles on the framework.
Figure 16:
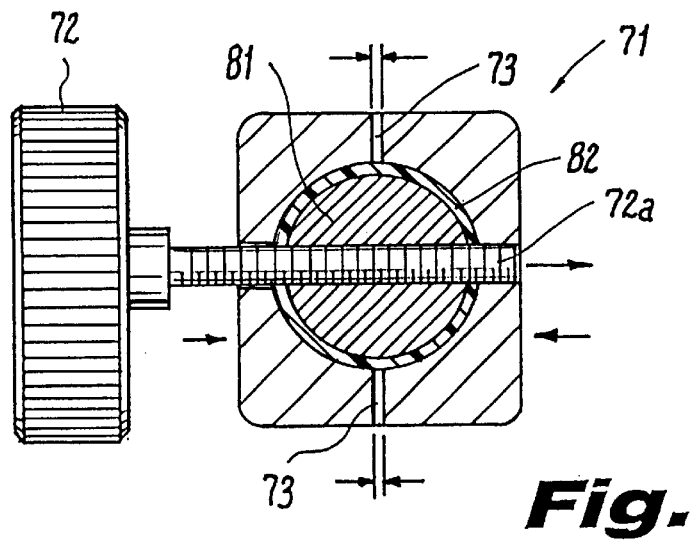
FIG. 16 is a sectional elevation view, taken through lines 16—16 of FIG. 15, showing the locking receptacles acting on the installed leg of the handlebar.

As shown in FIGS. 12 and 15 for pulling or pushing game or cargo upon portable cart 1, handle 80 extends rearwardly at an upward angle from joints 71 of either U-shaped rear bracket 70 for pushing portable cart 1, or from front U-shaped bracket 60 for pulling portable cart 1 (not shown). Furthermore, handle 80 may be permanently attached to either U-shaped bracket 60 or 70, or handle 80 may be removable and demountably attached to either front U-shaped bracket 60 or rear U-shaped bracket 70. Handle 80 has preferably two aluminum tubing connecting members about 22.5 inches in length, connected by a hand accommodating transverse bar of solid aluminum, and is 17.5 inches in width. Handle 80 includes connectors 81, having distal sleeves, such as PVC (polyvinyl chloride) sleeves 82, permanently affixed thereto, which are insertable within joints 71 by locking member 72, having threaded member 72a which passes through bore 71a of joint 71 and bore 81a of handle 80. Compression groove 73 exists in joint 71, providing compression of joint 71.

Handle 80 may optionally have an auxiliary extension member and clamp (not shown), so that it can be attached to the rear frame of a bicycle (not shown), to pull portable cart 1.

Figure 14:
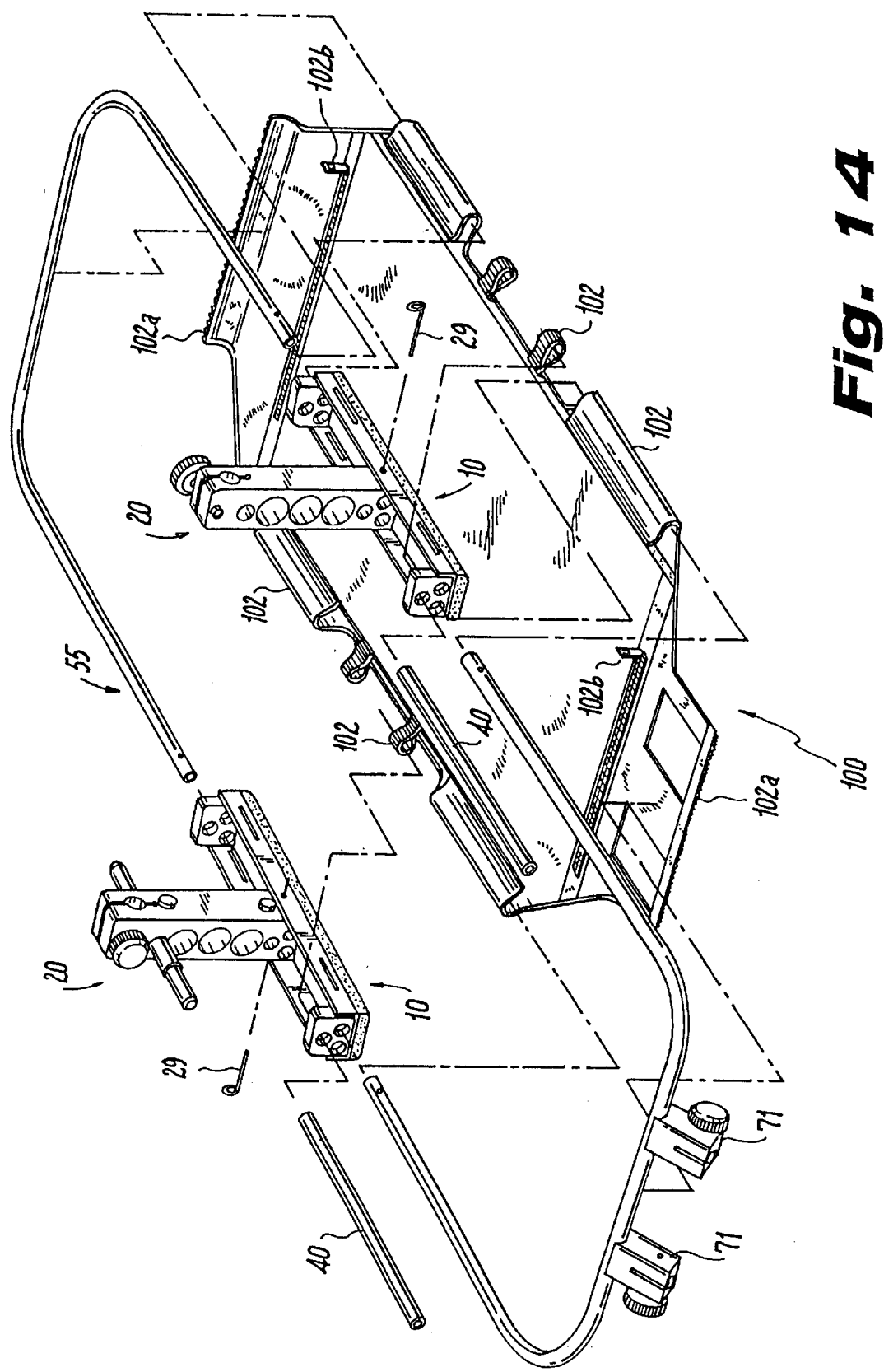
FIG. 14 is an exploded perspective view, inverted, of the gaming cart, illustrating the attachment of the stretcher canvas material to the framework components.
Figure 17:
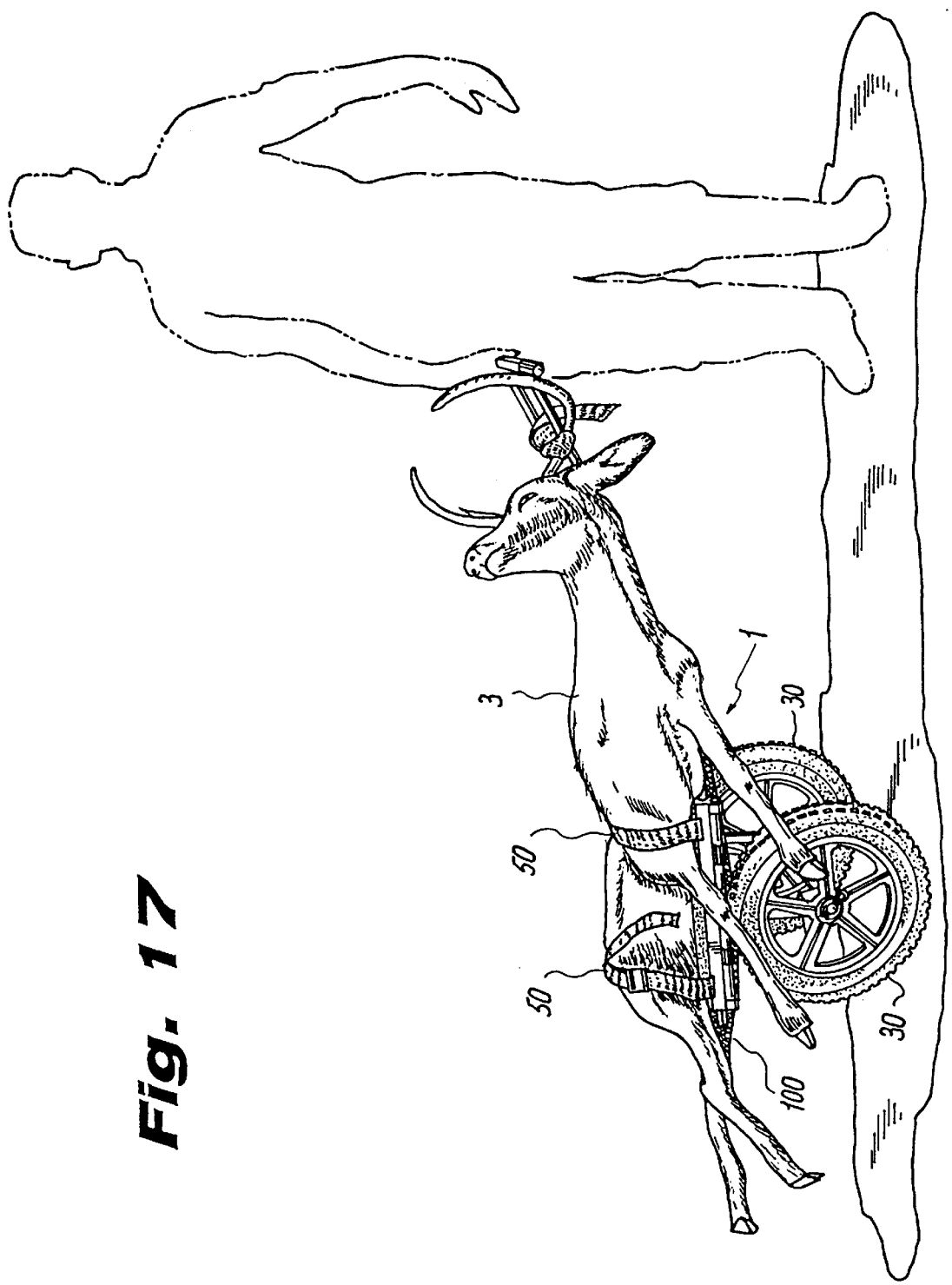
FIG. 17 is a perspective view of the gaming cart, with a deer fastened for transport.

To carry game 3, as shown in FIG. 17, or to carry an injured person in a rescue operation, FIG. 12 shows portable cart 1 having fabric stretcher 100 stretched tautly between horizontal load members 10 and preferably mounted over and around front and rear U-shaped brackets 60 and 70 of frame 55, by threading brackets 60, 70 through fasteners such as sewn-in loops 102 of fabric stretcher 100, which may alternatively be made of plastic or other taut load bearing material. Other types of fasteners can be used. For example, FIG. 14 shows that loop 102a is openable, and closed by fastener, such as zipper fastener 102b.

As also shown in FIG. 12, handle 80 may include a pair of posts extending obliquely off of a horizontal axis of portable cart 1, wherein a head rest cushion extends between the posts to support the head and neck of an injured person being transported upon stretcher 100.

FIGS. 18–20 show that to carry cargo, hollow fabric cargo well 110 is attached in the same manner to frame 55. Hollow cargo well 110 may also alternatively be made of plastic or other taut load bearing material, and covered by cover 112. FIGS. 18 and 19 also show wider wheels 130 for use on sand or granular terrain.

Assembly and Disassembly

For making a canoe cart from the disassembled portable cart 1, wheel retaining members, such as cotter pins 36, are taken out of axle members 32 in their stored position, and wheels 30 come out. Axle members 32 are then removed from between vertical struts 20. The axle members 32 are then clamped in a horizontal use position into receptacles 33 of rigid axle connector 34. Axle members are inserted between vertical struts 20 and locked in place. Wheels 30 are placed upon axle members 32 and secured by cotter pins 36. Kickstand 40 is loosened from its rest position and placed in place in receptacles within vertical struts 20. Canoe supporting cushions 13 are installed upon horizontal load supports 10 to support a canoe or boat thereupon. Straps 50 hold the canoe or boat installed upon cushions 13 in a secure transportable position.

To convert portable cart 1 into a game cart or a rescue cart, kickstands 40 are removed and fabric stretcher 100 is installed on U-shaped frame members 60, 70 of frame 55 frames by fasteners such as sewn loops 102 thereof. U-shaped frame members 60, 70 are placed on horizontal load supports 10, and kickstand members 40 are installed as braces for fabric stretcher 100. Straps 50 are then installed to securely hold game or an injured party upon stretcher 100. Then handle 80 is installed upon U-shaped bracket 60 or 70 of frame 55 to pull or push portable cart 1.

To convert portable cart 1 into a wagon to haul cargo, fabric stretcher 100 is removed and hollow well 110 is installed over U-shaped members 60, 70 of frame 55.

To make the portable chart 1 portable again, the components are disassembled in reverse into bag 120. Strap or straps 50 are used as a carry handle or for backpack shoulder loops.

Figure 23:
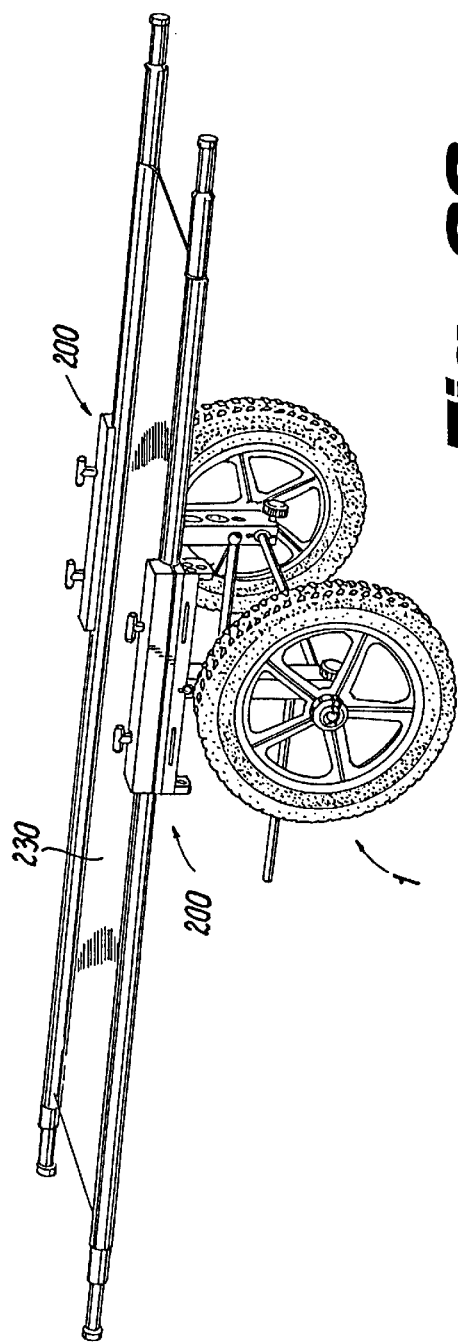
FIG. 23 is a perspective view of the portable cart of the present invention, showing the clamp as in FIGS. 21 and 22 carrying a rescue stretcher.

As shown in FIGS. 21–24, to convert portable cart 1 to a disabled person-bearing transportable carrier cart for search and rescue operations, support cushions 13 are removable from horizontal load supports 10 and replaced by clamping assembly 200, comprised of lower jaw 202, and upper jaw 204, each having longitudinally extending recesses 206 and 208 therein to grip perimeter frame rails of a load supporting transportable carrier, such as stretcher 230 therebetween as shown in FIG. 23.

Lower jaw 202 of clamping assembly 200 includes an engaging surface 210 with threaded studs 212 which are inserted into through-holes 214 of load supports 10, and permanently locked with nuts 216. Upper jaw 204 is provided with a pair of oblong through-slots, 218, to allow upper jaw 204 to slide on upper surface of lower jaw 202, when threaded T-handles 220 are loosened. As shown by the arrows in FIG. 22 this sliding action allows for quick removal of any stretcher frame rail secured between jaw assembly 200.

Figure 24:
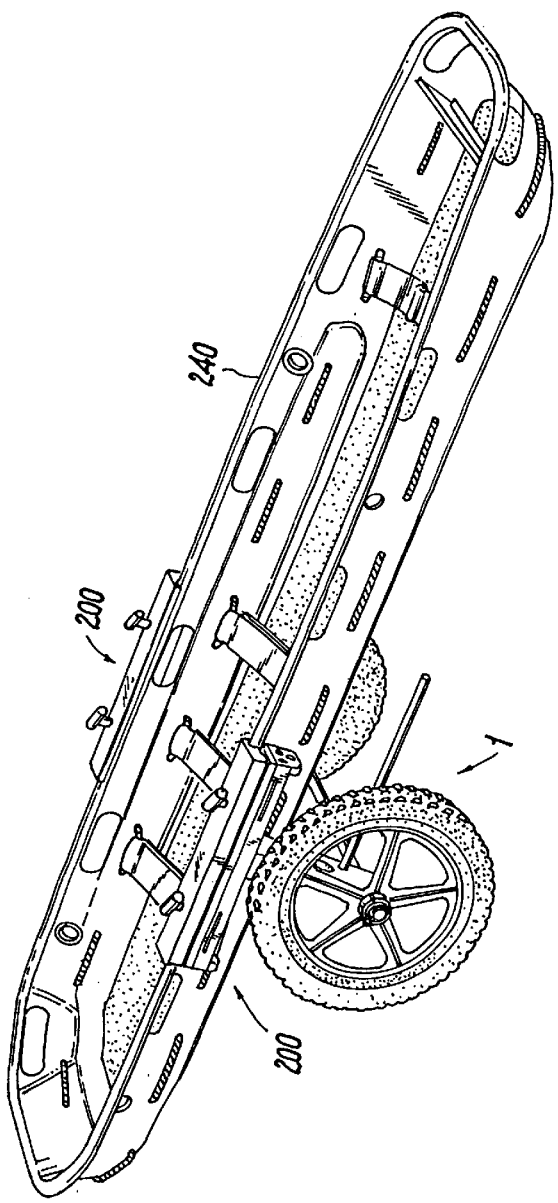
FIG. 24 is a perspective view of the portable cart carrying a Stokes-type personal rescue carrier.

FIGS. 23 and 24 are perspective views of a typical stretcher 230, and a Stokes-type rescue basket 240, securely clamped to portable cart 1 utilizing the previously described clamping assembly 200.

Figure 25:
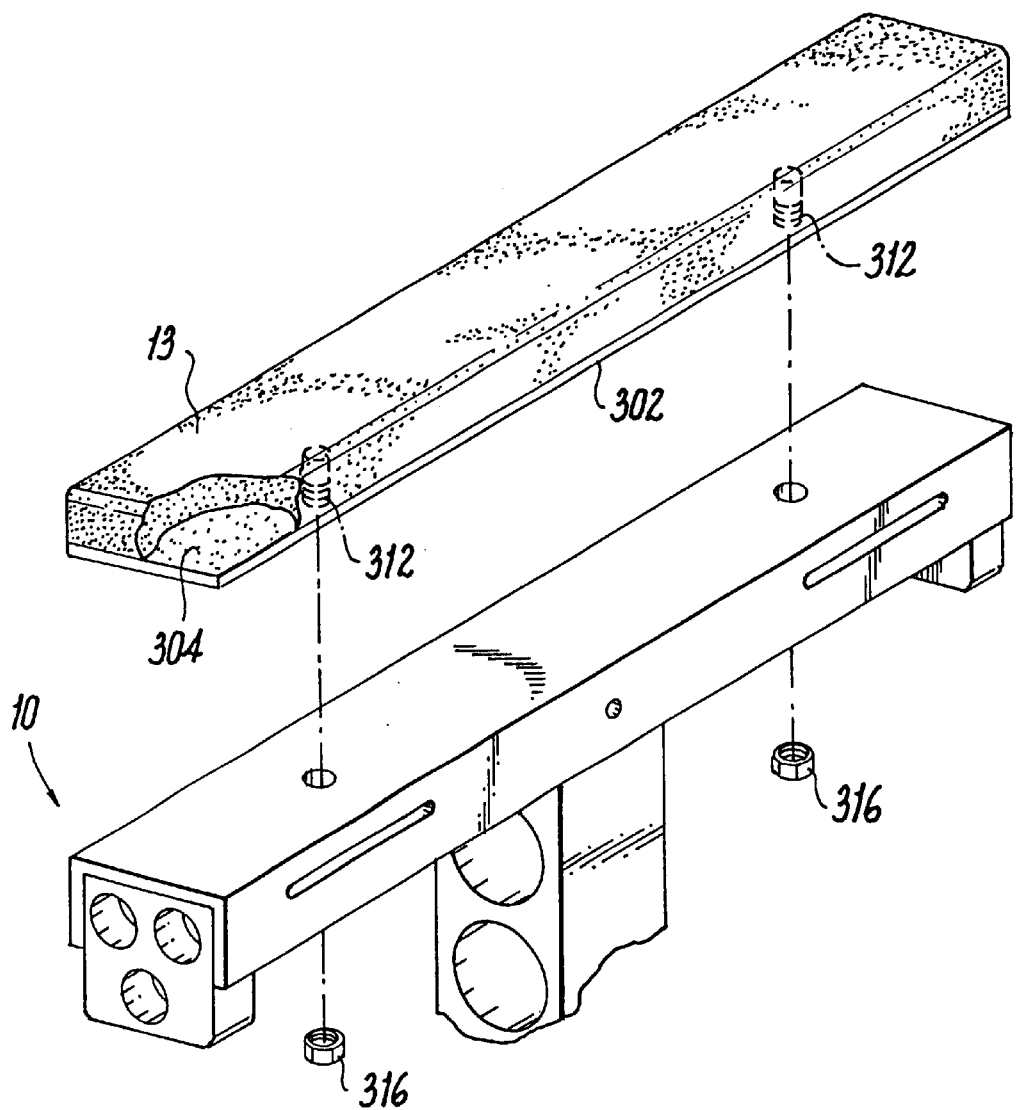
FIG. 25 is an exploded view of components of a further alternate embodiment for a support for removal of a boat support cushion therefrom.

As shown in FIG. 25 in this embodiment, instead of being permanently attached to each horizontal load support 10, removable support cushion 13 is permanently attached to removable plate 302 with an adhesive 304. This cushion assembly is removably attachable by nuts 316 and threaded studs 312, to each horizontal load support 10.

Figure 26:
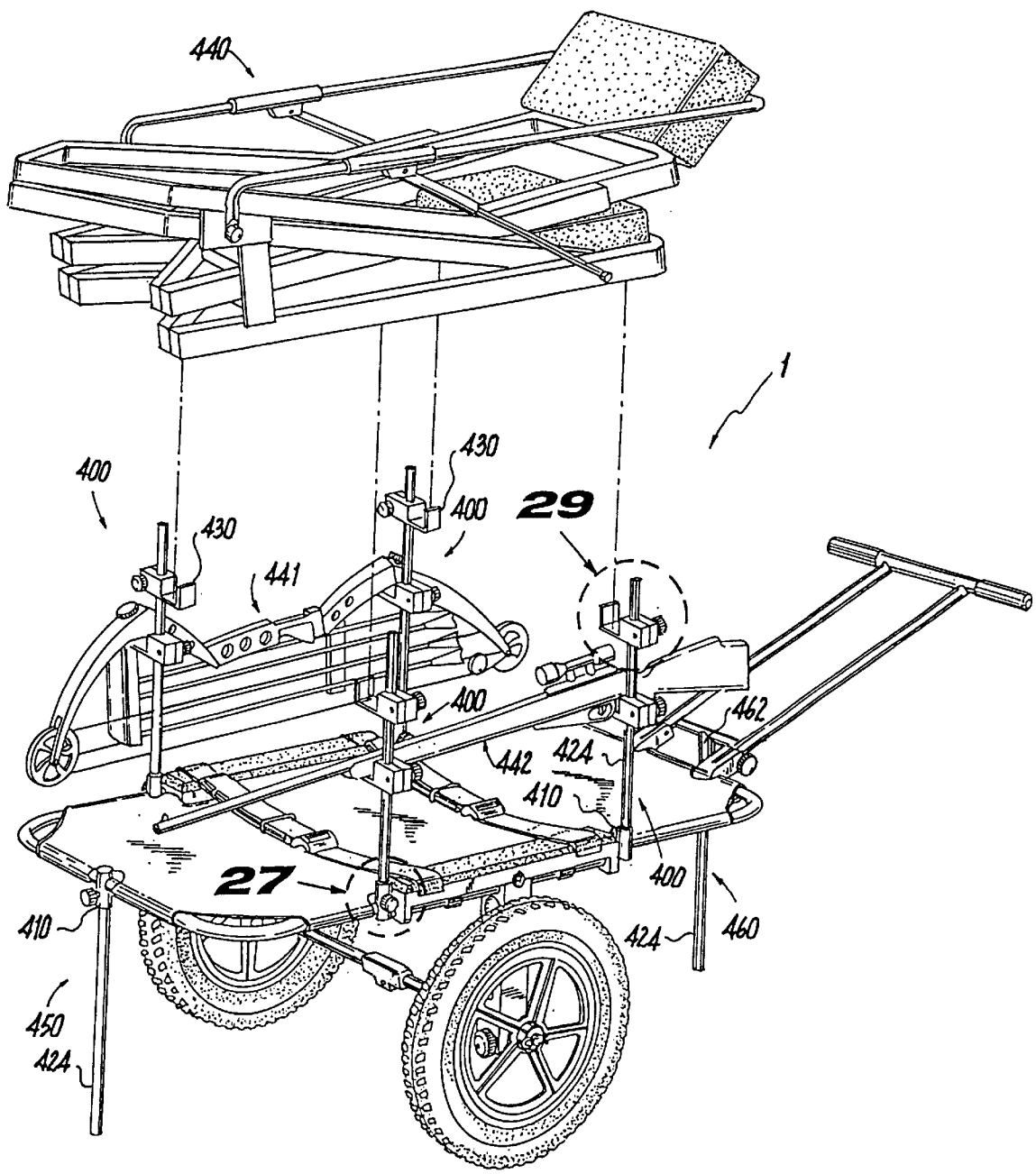
FIG. 26 is a perspective view of an alternate embodiment for a hunting cart with an accessory racking system for transport of hunting gear, such as a tree stand chair, archery implements and firearms thereon.

FIG. 26 illustrates portable cart 1, outfitted with a plurality of racking assemblies 400,each comprising a rail clamp 410, an upstanding post 424, and a hanger clamp 430. Rack assembly 400, when used in conjunction with additional rack assemblies 400, allows for transportation and quick removal of essential hunting gear such as a chair stand 440, archery equipment 441, and rifle 442. Other related items such as knapsacks and bedrolls may be supported by rack assembly 400, as well. Rack assembly 400 is easily disassembled from cart 1 upon reaching a chosen destination, and the components are conveniently transported within cart 1's storage backpack, such as carry bag 120 shown in FIG. 1.

Also illustrated in FIG. 26 are stabilizing assemblies 450 and 460. Assembly 450 makes use of post 420, which is friction-fit into an inverted rail clamp 410. Assembly 460 comprises an inverted tubular sleeve 462, optionally permanently welded to the handle assembly crosspiece. Sleeve 462 accepts post 424 in a similar fashion to rail clamp 410. These assemblies 450 460 serve to brace the cart 1 when it is parked.

Figure 27:
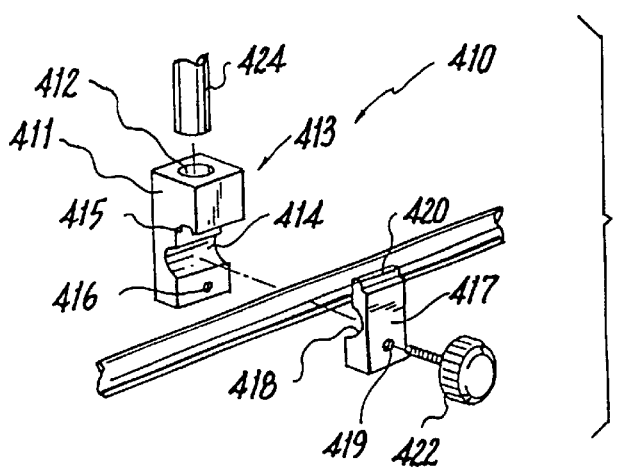
FIG. 27 is an exploded detail view of a quick release clamp for rail fastening to the cart shown in FIG. 26.

Turning to FIG. 27, which is highlighted in FIG. 26, an exploded perspective close-up detail view of rail clamp 410 is presented. Clamping block 411 is provided with a bore 412 to receive post 424, an attachment face 413 including a semi bore 414, and notch 415, and threaded bore 416. Plate 417 includes semi bore 418, through hole 419, and protruding rib 420.

Figure 28:
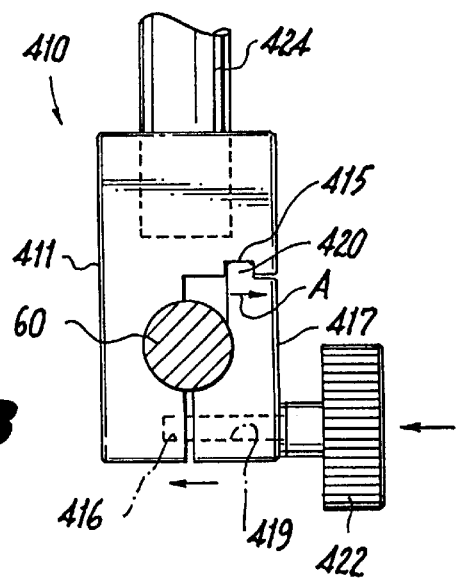
FIG. 28 is an assembled elevational view of the clamp of FIG. 27 attached to a rail.

As shown in FIG. 28, when threaded knob 422 is inserted into hole 419 of plate 417 and tightened into threaded bore 416 of block 411, clamping is achieved against frame member 60. Rib 420 is secured within notch 415 by a camming action in the direction of arrow "A".

Figure 29:
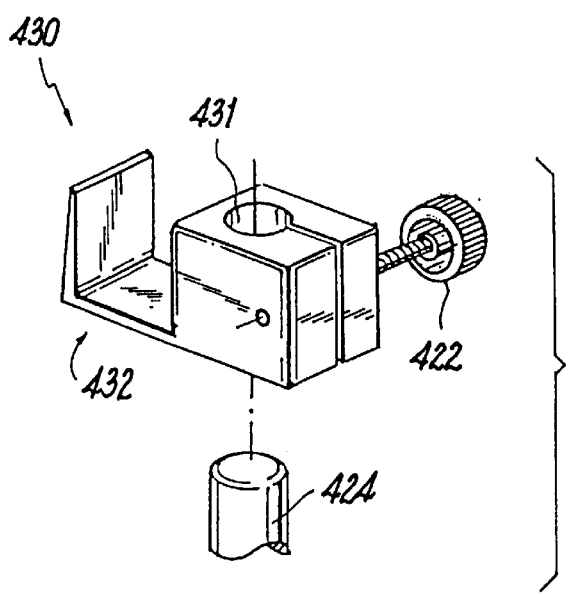
FIG. 29 is an exploded perspective view of a typical clamp for gear support for the cart as in FIG. 26.

FIG. 29 shows cantilevered hanger clamp 430, poised to slide down upstanding post 424. Hanger clamp 430 is provided with a bore 431 which is notched in a similar manner to clamping receptacles 71 of the handle assembly. The notch separates the body of hanger clamp 430 into two walls. Threaded knob 422 will compress the walls surrounding the notch, thereby tightening bore 431 around post 424. L-shaped region 432 is integrally formed with the body of the hanger clamp, and provides a strong an durable support for transporting hunting or other gear.

Figure 30:
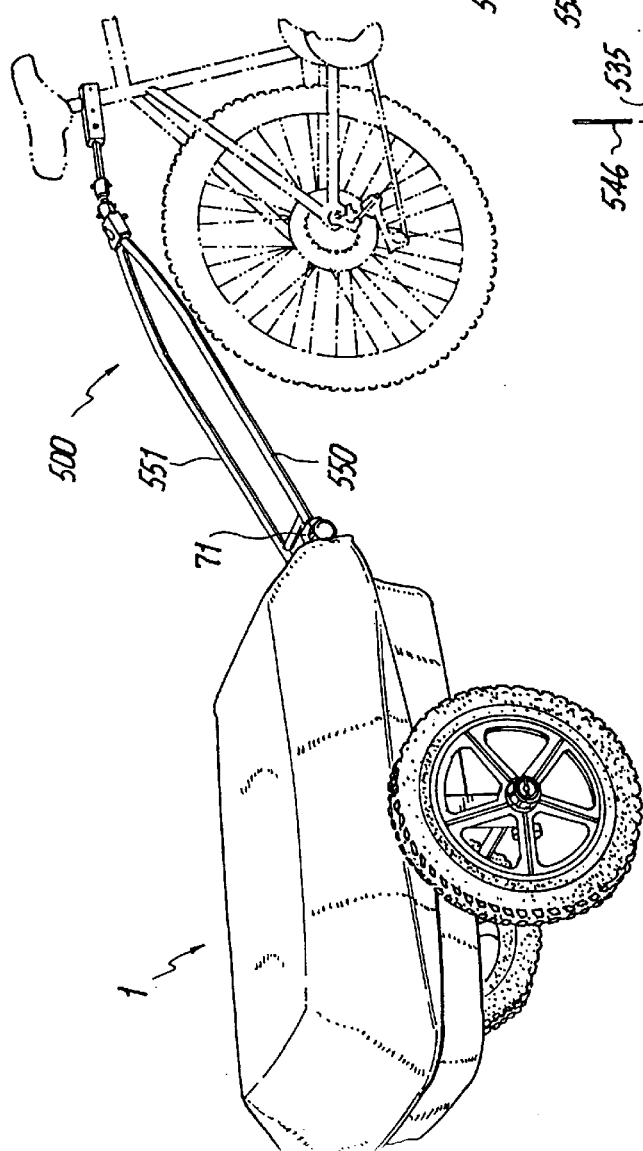
FIG. 30 is a perspective view of an anti-tipping attachment for connecting a bicycle to the portable cart of the present invention.

FIG. 30 is a perspective view of an anti-tipping linkage 500 which couples cart 1 to a bicycle. Linkage 500 counteracts cart roll-over caused by centrifugal force as the bicycle negotiates turns.

Figure 31:
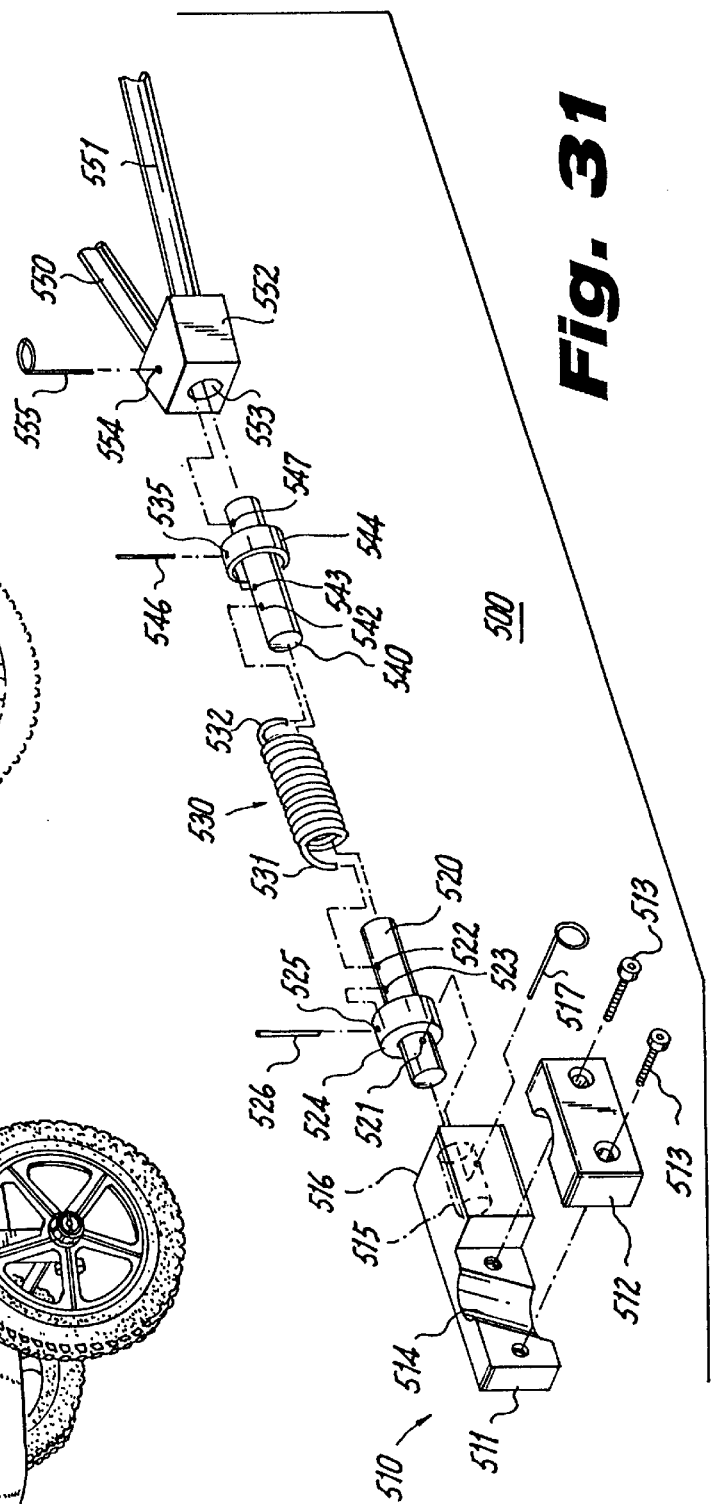
FIG. 31 is an exploded perspective of the components of FIG. 30.

FIG. 31 illustrates the components of linkage 500. Bicycle seat-stem compression clamp 510 is formed of a body portion 511, and plate 512, fastened by screws 513. Bore 514 is angled so that clamp 510 remains perpendicular when installed on a typical bicycle seat-stem. Clamp 510 is provided with a bore 515 on rear face 516, which accepts a shaft 520. Pin 517 passes through clamp and fixes shaft 520 via a through-bore. Shaft 520 includes through-bore 522 at its distal end. Another through-bore 523 is provided slightly proximal of aperture 522. When shaft 520 is inserted into coil spring 530, hooked leg 531 of the spring will fit into bore 522. A sliding collar 524 will then extend over leg 531 to prevent pull-out, and a pin 526 will be fitted into collar hole 525, and into bore 523 of the shaft 520, thereby securing the collar to the shaft and preventing removal of the coil spring.

A shaft 540 is provided for the opposite end of coil spring 530. Hooked leg 532 fits into bore 542 of the shaft, and collar 544 slides over and is fixed by pin 546, fitted into collar hole 535 and shaft bore 543.

Support rails 550 and 551 are fixed to handle clamps 71 of cart 1. The rails are bent into an inverted V configuration, and permanently affixed to block 552. Block 552 is provided with bore 553, into which the free end of shaft 540 is fitted. Pin 555 is inserted into through bore 554 of block 552, and passes through bore 547 of shaft 540, creating the continuous, secure anti-tipping linkage 500 between cart 1 and a bicycle. It is understood that during maneuvers of the bicycle, there will be no problems associated with a typical universal or pivot joint; the coil spring will absorb and disperse any rotational stresses, and will react as a 360° "living hinge".

It is further noted that other modifications may be made to the present invention, without departing from the scope of the invention, as noted in the appended Claims.

I claim:

1. A cart collapsible for storage and transport and expandable for use in carrying a load, comprising:

a pair of parallel, spaced apart horizontal rigid load support members; said load support members each being in the shape of an inverted U in cross section with a rectangular well and having a flat, top surface and a front end wall portion and a rear end wall portion;

a downward extending vertical strut for each of said support members having an upper end received within the well of each of said support members;

a wheel demountably attached to a lower end of each vertical strut and a demountable axle means for attaching said wheels to said vertical struts;

means in said support members to store and retain said axle means within said rectangular well when said cart is collapsed, with said pair of support members and vertical struts being placed adjacent to each other to allow convenient carrying of said cart after collapsing; and a carrier removably attached to said load support members for supporting a load placed upon the cart.

2. The cart as in claim 1, further comprising a clamping assembly means for gripping respective side frame rails of said carrier demountably mounted on the flat, top surface of each of said support members, said clamping assembly means comprising a lower jaw in contact with the flat, top surface of the support member, an upper jaw mounted on said lower jaw, said upper and lower jaws when assembled having cooperating recesses to grip said carrier and at least one fastener member for attaching said clamping assembly to said support member.

3. The cart as in claim 2 wherein one first clamping jaw of said pair of clamping jaws includes an engaging surface having a through hole for insertion of fasteners therethrough to attach said respective clamps to said respective horizontal load supports, and wherein further another clamping jaw is clamped over said carrier and to said first clamping jaw.

4. The cart as in claim 1, wherein said carrier comprises a frame mounted to said horizontal load support members.

5. The cart as in claim 4, wherein said frame comprises a pair of U-shaped brackets each having a pair of distal spaced apart ends, each said U-shaped bracket connected with each other said U-shaped bracket in an axially laid position.

6. The cart of claim 5, wherein a U-shaped front bracket of said pair of U-shaped brackets extends horizontally forward from front-end receptacle apertures of said horizontal load supports, said front bracket being demountably attached within said front end receptacle apertures and a U-shaped rear bracket of said pair of U-shaped brackets extends horizontally rearward from said rear end receptacle apertures of said horizontal load supports, said rear bracket being demountably attached within said rear end receptacle apertures.

7. The cart of claim 5, further comprising at least one ground engaging demountable upstanding support post respectively extending downward from said frame, said at least one upstanding post contacting the ground.

8. The cart of claim 7, wherein said demountable upstanding post is removably attached to said carrier by a clamp attached to said carrier.

9. The cart as in claim 1, wherein said carrier comprises at least one cushion supporting a boat thereon.

10. The cart as in claim 9, wherein said at least one boat cushion comprises a pair of boat cushions, wherein each said boat cushion is permanently affixed to each said load support member.

11. The cart as in claim 10, wherein each said boat cushion is removably attachable to each said load support member.

12. The cart as in claim 1, wherein said carrier is demountably attachable to said horizontal support members and said carrier comprises a load supporting transportable carrier therebetween.

13. The cart as in claim 12 wherein said load supporting transportable carrier is a flexible rescue body-supporting stretcher.

14. The cart as in claim 12, wherein said loading supporting transportable carrier is a Stokes-type rescue carrier bed.

15. The car as in claim 1, wherein said carrier comprises at least one gear support rack.

16. The cart as in claim 15, wherein said gear support rack is demountably attachable to said cart by respective clamps attachable to said respective horizontal load supports.

17. The cart as in claim 16, wherein said clamps each comprise a pair of longitudinally extending clamping jaws having respective longitudinally extending recesses therein gripping respective frame rails of said load supporting transportable carrier therein.

18. The cart as in claim 15, wherein said at least one gear support rack comprises a plurality of gear support racks.

19. The cart as in claim 15, wherein said at least one support rack comprises a rail clamp attachable to said frame, said rail clamp having a ground engaging upstanding post extending therefrom, said upstanding post supporting a cantilevered hanger clamp slidably mounted at an upper portion thereof.

20. The cart as in claim 19, wherein said rail clamp comprises a clamping block receiving said upstanding post in a first semi-bore therein, said clamping block having a further notch accommodating a protruding rib of a complementary plate having a further semi-bore forming a bore with said first semi-bore for receiving a rail of said frame therebetween.

21. The cart as in claim 19, wherein said cantilevered hanger clamp comprises a body having a bore for slidable insertion of said upstanding post therein, said body having a notch extending outward from said bore, separating a pair of walls urged toward each other, to tighten said cantilevered hanger clamp around said upstanding post.

22. The cart as in claim 1, further comprising a handle, said handle extending obliquely off of a horizontal axis of said cart, said handle having a headrest cushion extending therebetween for accommodating the head and neck region of a person being transported upon said carrier of said cart.

23. The cart as in claim 1, further comprising at least one adjustable load-securing strap slidably attached to both respective horizontal load support members in transverse relationship to said load support members.

* * * * *